(12) United States Patent
Schilling

(10) Patent No.: US 10,917,036 B2
(45) Date of Patent: Feb. 9, 2021

(54) TILTING SOLAR PANEL MOUNT

(71) Applicant: Jan Christopher Schilling, Liberty Township, OH (US)

(72) Inventor: Jan Christopher Schilling, Liberty Township, OH (US)

( * ) Notice: Subject to any disclaimer, the term of this patent is extended or adjusted under 35 U.S.C. 154(b) by 0 days.

(21) Appl. No.: 16/856,371

(22) Filed: Apr. 23, 2020

(65) Prior Publication Data

US 2020/0350853 A1 Nov. 5, 2020

Related U.S. Application Data

(60) Provisional application No. 62/841,717, filed on May 1, 2019.

(51) Int. Cl.
*H02S 20/30* (2014.01)
*H02S 30/10* (2014.01)

(52) U.S. Cl.
CPC .............. *H02S 20/30* (2014.12); *H02S 30/10* (2014.12)

(58) Field of Classification Search
CPC .................................. H02S 20/30; H02S 30/10
USPC ......................................................... 136/244
See application file for complete search history.

(56) References Cited

U.S. PATENT DOCUMENTS

| | | | |
|---|---|---|---|
| 4,110,009 A | 8/1978 | Bunch | |
| 4,585,318 A | 4/1986 | Seifert | |
| 6,848,442 B2 | 2/2005 | Haber | |
| 7,607,427 B2 | 10/2009 | Yi et al. | |
| 9,599,280 B2 | 3/2017 | West et al. | |
| 9,784,476 B2 | 10/2017 | Stein | |
| 9,945,586 B2 | 4/2018 | Siddiqui et al. | |
| 10,135,388 B2 | 11/2018 | Madrone et al. | |
| 2009/0301466 A1 | 12/2009 | Humanes Asensio et al. | |
| 2013/0319402 A1 | 12/2013 | Shaw | |
| 2015/0013750 A1* | 1/2015 | Meppelink | F24S 25/70 136/245 |

(Continued)

FOREIGN PATENT DOCUMENTS

| | | |
|---|---|---|
| CN | 208226947 U | 12/2018 |
| JP | 2013187531 A | 9/2013 |
| WO | 2011155658 A1 | 12/2011 |

OTHER PUBLICATIONS

Landau, Charles R., Optimum Tilt of Solar Panels, https://solarpaneltill.com/.

*Primary Examiner* — Magali P Slawski
*Assistant Examiner* — Kourtney R S Carlson
(74) *Attorney, Agent, or Firm* — Dorton & Willis, LLP; Matthew P. Hayden

(57) ABSTRACT

An example device for mounting for a solar array may include a solar panel carrier configured to receive a solar array to form a panel assembly; a pivot configured to pivotably secure the solar panel carrier with respect to a support structure; and/or a restoring moment element operatively connected to the solar panel carrier and configured to exert a restoring moment on the solar panel carrier opposite in direction and approximately equal in magnitude to a gravitational moment of the panel assembly when the solar panel carrier is tilted to various angular positions. When the solar panel carrier is at a nominal angular position, a center of gravity of the panel assembly may be above and substantially vertically aligned with the pivot axis.

28 Claims, 18 Drawing Sheets

(56) References Cited

U.S. PATENT DOCUMENTS

| | | | |
|---|---|---|---|
| 2015/0234031 A1* | 8/2015 | Corio | G01S 3/7861 |
| | | | 250/203.4 |
| 2016/0020723 A1* | 1/2016 | Inoue | H02S 20/00 |
| | | | 136/246 |
| 2016/0072428 A1* | 3/2016 | Li | H02S 20/32 |
| | | | 136/246 |
| 2018/0076757 A1 | 3/2018 | Gross et al. | |
| 2018/0254740 A1* | 9/2018 | Corio | F24S 30/425 |
| 2018/0302023 A1 | 10/2018 | Tanaka | |
| 2019/0036476 A1 | 1/2019 | Xu et al. | |
| 2019/0305717 A1* | 10/2019 | Allen | H02S 20/24 |
| 2020/0076359 A1* | 3/2020 | Bahn | F24S 40/20 |

\* cited by examiner

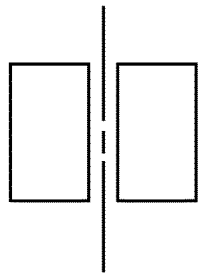
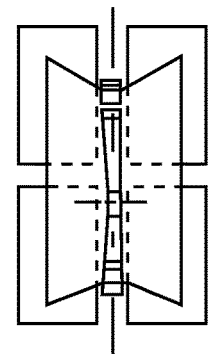
FIG. 18A          FIG. 18B          FIG. 18C
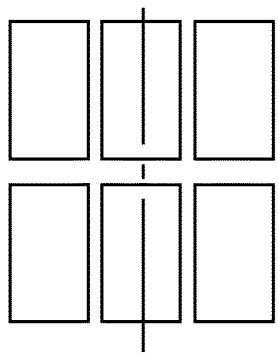
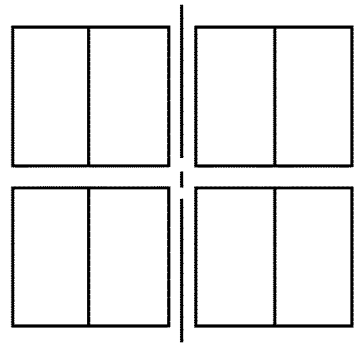
FIG. 18D          FIG. 18E
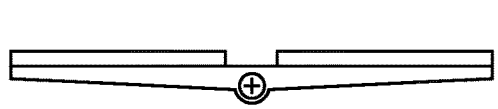
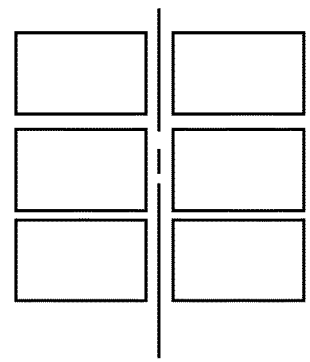
FIG. 18F          FIG. 18G

TILTING SOLAR PANEL MOUNT

CROSS REFERENCE TO RELATED APPLICATION

This application claims the benefit of U.S. Provisional Patent Application Ser. No. 62/841,717, filed on May 1, 2019, which is incorporated by reference.

BACKGROUND

The present disclosure is directed to mounting devices for solar panels, more particularly, to solar panel mounts that facilitate safely and easily tilting solar panels, such as between winter and summer positions.

The present disclosure contemplates that solar energy may be used for various purposes. For example, photovoltaic solar panels absorb sunlight and generate electricity. The present disclosure contemplates that the amount of electrical energy that is produced by a photovoltaic solar panel may vary depending on the orientation of the panel with respect to the Sun. Generally, a photovoltaic solar panel may produce the most electrical energy when panel is oriented such that the Sun's rays strike the face of the solar panel generally perpendicularly.

The present disclosure contemplates that, generally, photovoltaic solar panels may produce more electrical energy when the panels are oriented substantially towards the equator (South in the northern hemisphere or North in the southern hemisphere). The present disclosure contemplates that although solar panels may be installed at a fixed angle with respect to the horizon, tilting the solar panels to account for the Sun's varying elevation across the seasons will facilitate significantly greater electrical energy production. Generally, seasonal tilting will provide a greater benefit at higher latitudes than at lower latitudes. Similarly, the present disclosure contemplates that rotating the solar panels East to West throughout the day to account for the Sun's apparent movement across the sky will facilitate significantly greater electrical energy production.

Similarly, the present disclosure contemplates that the amount of energy collected by other types of solar collectors may vary depending on the orientation of the panel with respect to the Sun. Accordingly, seasonal tilting and/or rotating the panels East to West throughout the day may facilitate significantly greater energy collection by solar collectors other than photovoltaic panels.

The present disclosure contemplates that an articulating mechanism may be used to facilitate tilting solar panels. The present disclosure contemplates that some solar panel articulating mechanisms may create large unbalanced twisting moments as the panels are tilted, particularly when an array including multiple solar panels is tilted. The present disclosure contemplates that these large, unbalance twisting moments may be potentially unsafe for individuals to handle in manually operated articulating mechanisms and/or may require a high-torque motor or geared system for motor-operated articulating mechanisms.

Accordingly, there is a need for improved tilting solar panels mounts and solar installations including improved tiling solar panel mounts.

SUMMARY

It is an aspect of the present disclosure to provide a device for mounting for a solar array that may include a solar panel carrier configured to receive a solar array attached thereto to form a panel assembly; a pivot configured to pivotably secure the solar panel carrier with respect to a support structure so that the solar panel carrier is tiltable about a pivot axis between a first angular position, a second angular position, and a nominal angular position between the first angular position and the second angular position; and a restoring moment element operatively connected to the solar panel carrier and configured to exert a restoring moment on the solar panel carrier opposite in direction and approximately equal in magnitude to a gravitational moment of the panel assembly when the solar panel carrier is at the first angular position, the second angular position, and between the first angular position and the second angular position. When the solar panel carrier is at a nominal angular position between the first angular position and the second angular position, a center of gravity of the panel assembly may be above and substantially vertically aligned with the pivot axis.

In a detailed embodiment, the restoring moment may include a first restoring moment in a first direction when the solar panel carrier is between the nominal angular position and the first angular position. The restoring moment may include a second restoring moment in a second direction opposite the first direction when the solar panel carrier is between the nominal angular position and the second angular position. When the solar panel carrier is at the nominal angular position, the first restoring moment may be approximately zero and the second restoring moment may be approximately zero. When the solar panel carrier is between the nominal angular position and the first angular position, the first restoring moment may be greater than zero and the second restoring moment may be approximately zero. When the solar panel carrier is between the nominal angular position and the second angular position, the first restoring moment may be approximately zero and the second restoring moment may be greater than zero.

In a detailed embodiment, the restoring moment element may include a first torsion spring arranged to exert the first restoring moment. The restoring moment element may include a second torsion spring arranged to exert the second restoring moment. Each of the first torsion spring and the second torsion spring may include a respective helical torsion spring disposed around the pivot axis. The first torsion spring may be disposed about the pivot so that a first leg of the first torsion spring is arranged to act on the support structure and a second leg of the first torsion spring is arranged to act on the solar panel carrier. The second torsion spring may be disposed about the pivot so that a first leg of the second torsion spring is arranged to act on the support structure and a second leg of the second torsion spring is arranged to act on the solar panel carrier. When the solar panel carrier is between the nominal angular position and the first angular position, the first torsion spring may exert the first restoring moment between the support structure and the solar panel carrier about the pivot axis. When the solar panel carrier is between the nominal angular position and the first angular position, the second torsion spring may be disengaged from the support structure and/or the panel carrier. When the solar panel carrier is between the nominal angular position and the second angular position, the second torsion spring may exert the second restoring moment between the support structure and the solar panel carrier about the pivot axis. When the solar panel carrier is between the nominal angular position and the second angular position, the first torsion spring may be disengaged from the support structure and/or the panel carrier.

In a detailed embodiment, the restoring moment element may include a counterweight assembly coupled for rotation with the solar panel carrier about the pivot axis. When the solar panel carrier is at the nominal angular position, a center of gravity of the counterweight assembly may be below and substantially vertically aligned with the pivot axis. The counterweight assembly may include an arm coupled to the solar panel carrier and a counterweight disposed on the arm radially distant from the pivot axis. The restoring moment element may include a combined counterweight and lock assembly configured to selectively secure the solar panel assembly at the first angular position and/or the second angular position. The combined counterweight and lock assembly may include the counterweight assembly. The restoring moment element may include a first torsion spring and a second torsion spring. When the solar panel carrier is between the nominal angular position and the first angular position, the counterweight assembly and the first torsion spring may together exert the first restoring moment. When the solar panel carrier is between the nominal angular position and the second angular position, the counterweight assembly and the second torsion spring may together exert the second restoring moment.

In a detailed embodiment, the restoring moment element may include a first linear extension spring arranged to exert the first restoring moment. The restoring moment element may include a first linear extension spring assembly comprising an arm extending from and coupled for rotation with the solar panel carrier, a first coupler rotatably and slidably disposed on the arm, a first anchor disposed at a first fixed position with respect to the support structure, and the first linear extension spring. The first linear extension spring may extend between the first anchor and the first coupler. The first coupler may include a slot rotatably and slidably disposed on a traveler disposed on the arm. The restoring moment element may include a second linear extension spring assembly arranged to exert the second restoring moment. The second linear extension spring assembly may include a second coupler rotatably and slidably disposed on the arm, a second anchor disposed at a second fixed position with respect to the support structure, and a second linear extension spring. The second linear extension spring may extend between the second anchor and the second coupler.

In a detailed embodiment, the pivot axis may be a seasonal pivot axis or a daily pivot axis.

In a detailed embodiment, a solar panel installation may include the support structure; the device for mounting for a solar array as described above mounted to the support structure; and the solar array secured to the solar panel carrier. The solar array may include at least one solar panel. The support structure may be disposed at a fixed location or disposed on a movable object.

It is an aspect of the present disclosure to provide a method of installing a solar array including disposing a pivot of a solar panel mount on a support structure, the pivot pivotably securing a solar panel carrier to the support structure so that the solar panel carrier is tiltable about a pivot axis between a first angular position and a second angular position. When a solar array is disposed on the solar panel carrier, the solar array and the panel carrier may form a panel assembly. When the solar panel carrier is at a nominal angular position between the first angular position and the second angular position, a center of gravity of the panel assembly may be above and substantially vertically aligned with the pivot axis. The solar panel mount may include a restoring moment element operatively connected to the solar panel carrier and configured to exert a restoring moment on the solar panel carrier opposite in direction and approximately equal in magnitude to a gravitational moment of the panel assembly when the solar panel carrier is at the first angular position, the second angular position, and between the first angular position and the second angular position.

In a detailed embodiment, the method may include disposing the solar array on the solar panel carrier, the solar array comprising at least one solar panel. The method may include installing the support structure, which may include installing the support structure at a fixed location or installing the support structure on a movable object.

BRIEF DESCRIPTION OF THE DRAWINGS

Example embodiments are described in conjunction with the accompanying drawing figures in which:

FIG. 18A is a view illustrating an alternative example arrangement of solar panels which may be used in connection with some two-axis solar panel mounts;

FIG. 18B is a view illustrating an alternative example arrangement of solar panels which may be used in connection with some two-axis solar panel mounts;

FIG. 18C is a view illustrating an alternative example arrangement of solar panels which may be used in connection with some two-axis solar panel mounts;

FIG. 18D is a view illustrating an alternative example arrangement of solar panels which may be used in connection with some two-axis solar panel mounts;

FIG. 18E is a view illustrating an alternative example arrangement of solar panels which may be used in connection with some two-axis solar panel mounts;

FIG. 18F is a view illustrating an alternative example arrangement of solar panels which may be used in connection with some two-axis solar panel mounts;

FIG. 18G is a view illustrating an alternative example arrangement of solar panels which may be used in connection with some two-axis solar panel mounts;

DETAILED DESCRIPTION

Example embodiments according to the present disclosure are described and illustrated below to encompass devices, methods, and techniques relating to solar panel mounts. Of course, it will be apparent to those of ordinary skill in the art that the embodiments discussed below are examples and may be reconfigured without departing from the scope and spirit of the present disclosure. It is also to be understood that variations of the example embodiments contemplated by one of ordinary skill in the art shall concurrently comprise part of the instant disclosure. However, for clarity and precision, the example embodiments as discussed below may include optional steps, methods, and features that one of ordinary skill should recognize as not being a requisite to fall within the scope of the present disclosure.

The present disclosure includes, among other things, mounting devices for solar panels, and more particularly, solar panel mounts that facilitate safely and easily tilting solar panels, such as between winter and summer positions ("seasonal tilting") and/or throughout each day between morning and evening ("daily rotation"). In some example embodiments according to at least some aspects of the present disclosure, a solar panel mount may include a restoring moment element configured to exert a restoring moment that may substantially counteract a moment caused by gravity. In some example embodiments according to at least some aspects of the present disclosure, an external force and/or moment required to tilt the panel and/or hold the panel at a particular angular position may be minimized or small.

Figure 1:
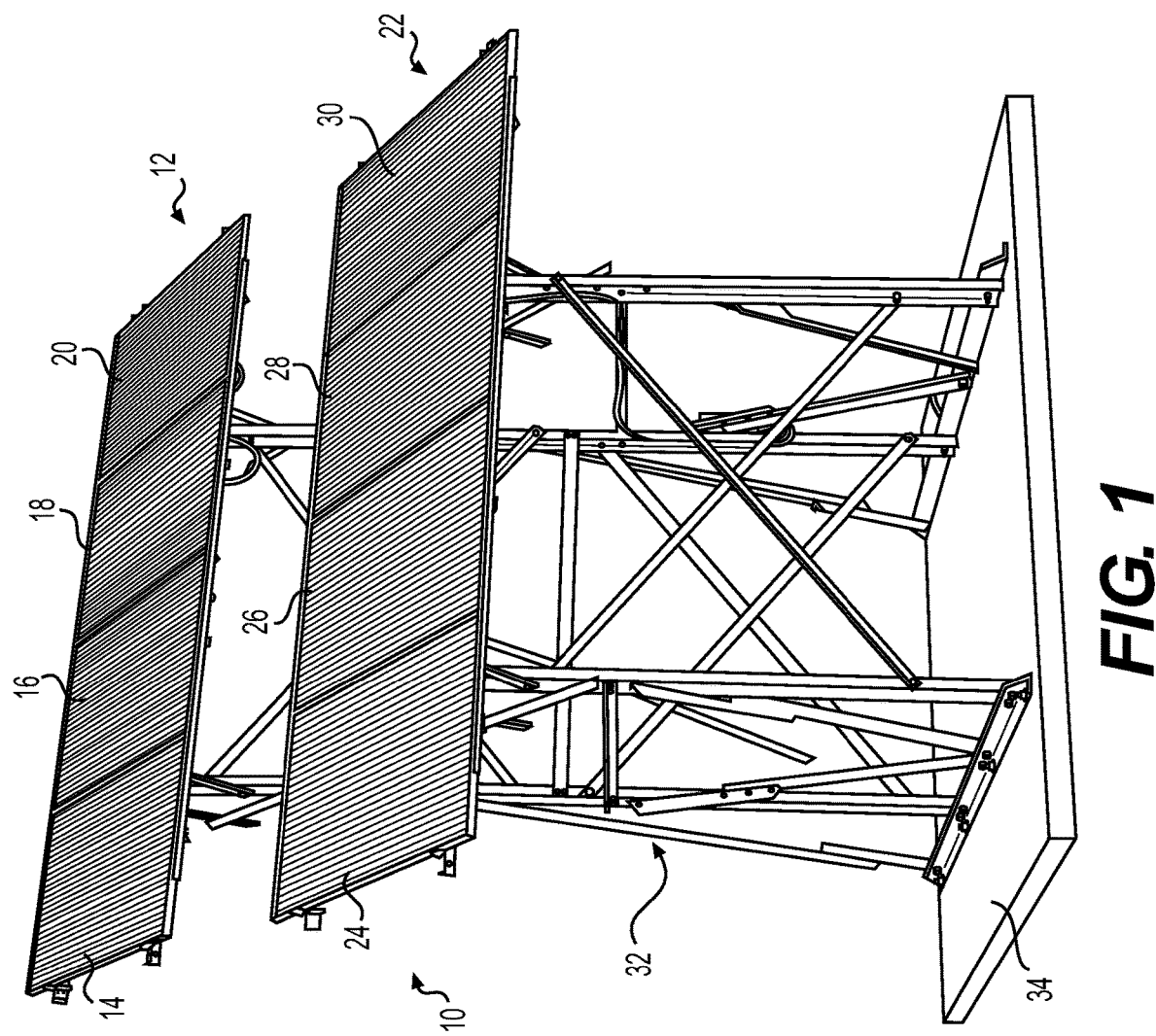
FIG. 1 is a perspective view of an example solar panel installation.

FIG. 1 is a perspective view of an example solar panel installation 10, according to at least some aspects of the present disclosure. Solar panel installation 10 may include one or more solar panel arrays 12, 22, each of which may include one or more solar panels 14, 16, 18, 20, 24, 26, 28, 30. Solar panel arrays 12, 22 may be disposed on one or more solar panel mounts according to at least some aspects of the various example embodiments described herein, which may include generally horizontally extending, lateral support members partially visible in FIG. 1. The solar panel mount may be disposed on a support structure 32, which may be configured to support the static weight of solar panel arrays 12, 22 as well as dynamic loads, such as wind loads, snow loads, etc. In some example embodiments, support structure 32 may be constructed from metal (e.g., aluminum and/or steel), which may be in the form of channel, tubing, and/or angle and/or which may be bolted and/or welded together. In some example embodiments, support structure 32 may be secured to a foundation 34, such as one or more concrete pads, piers, footers, etc. In some example embodiments, support structure 32 may be disposed on an existing fixed structure, such as a building's roof. In some example embodiments, support structure 32 may be disposed on a movable object, such as a truck, van, trailer, skid, boat, barge, buoy, etc.

Some example embodiments according to at least some aspects of the present disclosure may be configured to facilitate tilting of solar panel arrays 12, 22, such as between a flatter inclination in the summer and a steeper inclination in the winter. In some example embodiments, as solar panel array 12, 22 is tilted, a horizontal offset of the center of gravity of solar panel array 12, 22 from a pivot axis may increase, thereby increasing the moment (torque) on the solar panel array 12, 22 due to gravity. As used herein, "gravitational moment" may refer to a moment (torque) induced by gravity acting on a mass, such as a moment caused by the force of gravity acting on solar panel array 12, 22. It will be appreciated that a "gravitational moment" may vary as the angular position of a solar panel array 12, 22 changes. Some example embodiments provide various features to counteract gravitational moments so that tilting solar panel array 12, 22 is safer and requires smaller externally applied forces (e.g., by a person or a motor). Some example embodiments may be configured to provide a restoring moment opposite in direction to the gravitational moment and approximately equaling the gravitational moment in magnitude, across a range of angular positions. As used herein, "restoring moment" may refer to a moment (torque) that a least partially counteracts a gravitational moment. It will be appreciated that a "restoring moment," like its corresponding gravitational moment, may vary as the angular position of a solar panel array 12, 22 changes. As used herein, a restoring moment and a gravitational moment may be "approximately equal" if, at any angular position within a particular range of angular positions, the magnitudes of the restoring moment and the gravitational moment are substantially equal, differ by no more than about 5%, differ by no more than about 10%, differ by no more than about 20%, or differ by no more than about 30%, for example. As another example, a restoring moment may be approximately equal to a gravitational moment if less than about 50% of an externally applied moment necessary to change the angular position of a solar panel array 12, 22 is due to the gravitational moment, the remainder being due to bearing friction, for example. Accordingly, some example embodiments may facilitate safer and easier manual tilting of solar panel arrays 12, 22 and/or may facilitate the use of smaller and/or less expensive motors and/or gearboxes for mechanized tilting of solar panel arrays 12, 22.

In an example solar installation generally similar to solar installation 100 but not including a solar panel mount having various features according to the present disclosure, a solar panel array weighing about 300 pounds that is tilted between a winter or maximum inclination ("α") of about 60 degrees and a summer or minimum inclination ("γ") of about 12 degrees may produce a maximum gravitational moment of about 1559 inch-pounds.

Figure 2:
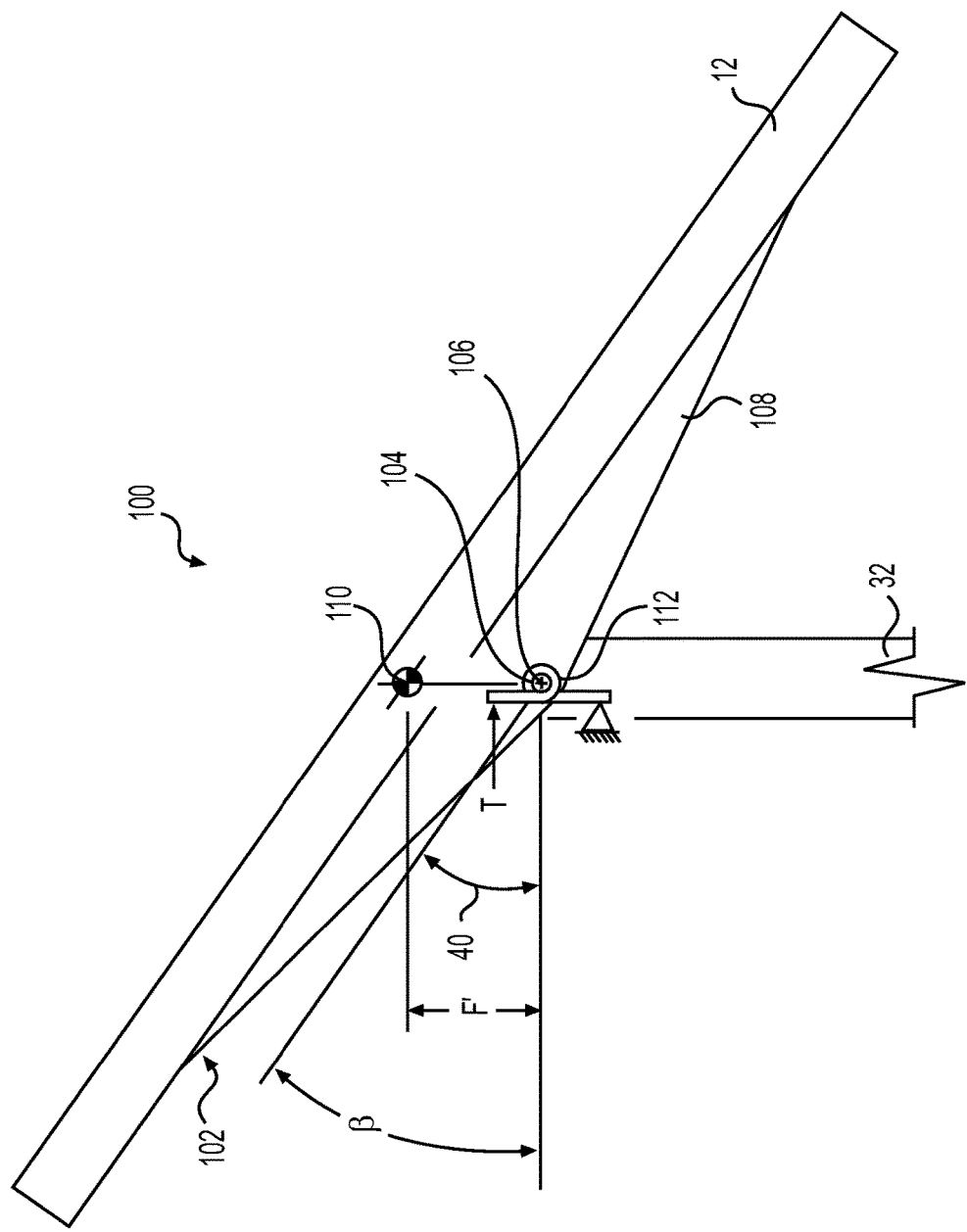
FIG. 2 is a side elevation view of an example solar panel mount including a torsion spring providing a counter-clockwise restoring moment.
Figure 3:
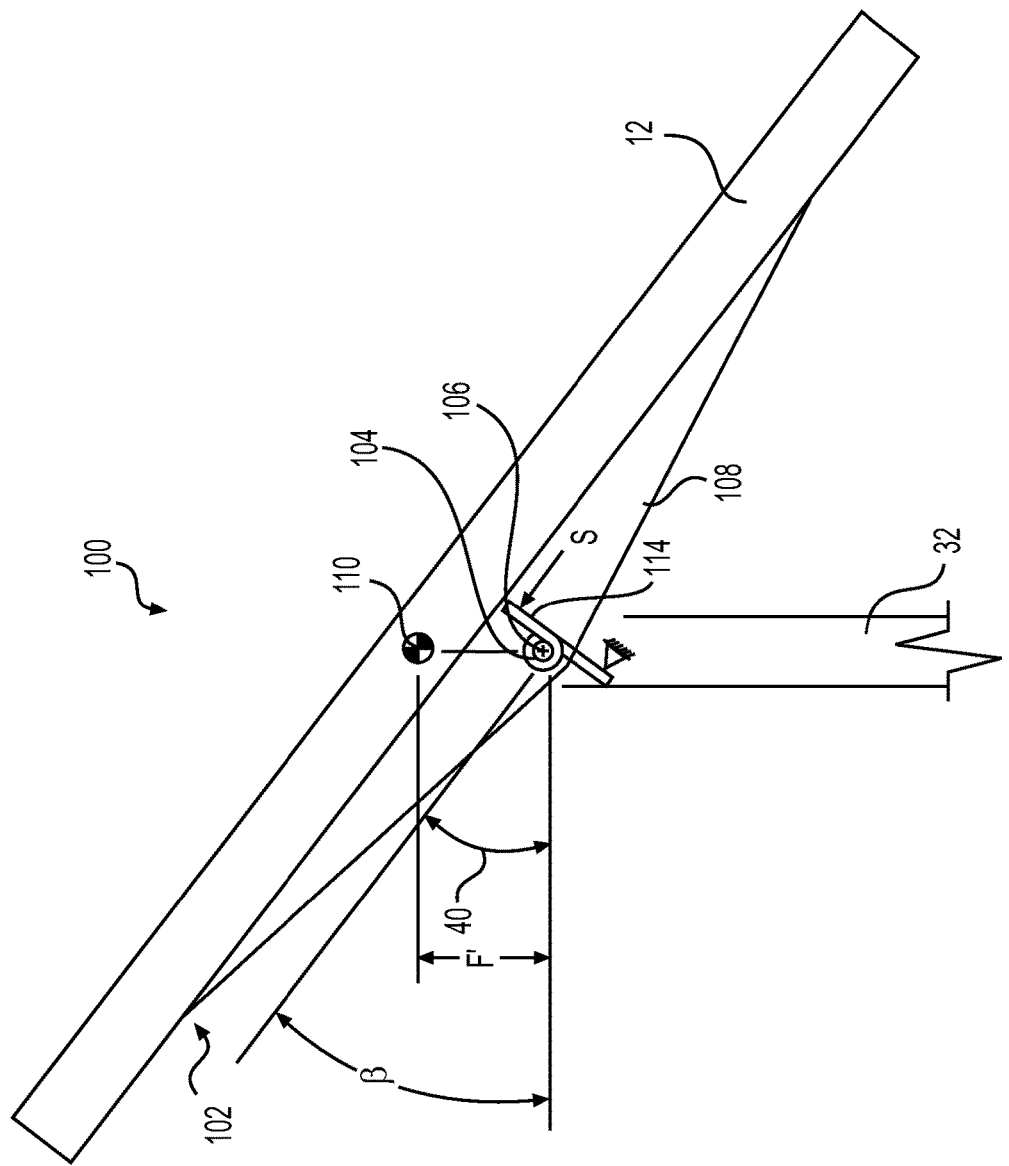
FIG. 3 is a side elevation view of example solar panel mount including a torsion spring providing a clockwise restoring moment.

FIG. 2 is a side elevation view of an example solar panel mount 100 including a restoring moment element, such as a first torsion spring 112, providing a counter-clockwise restoring moment, according to at least some aspects of the present disclosure. FIG. 3 is a side elevation view of example solar panel mount 100 including a restoring moment element, such as a second torsion spring 114 providing a clockwise restoring moment, according to at least some aspects of the present disclosure. Solar panel mount 100 may be utilized in solar panel installation 10

(FIG. 1). In some example embodiments, solar panel installation 10 (FIG. 1) may include solar panel mounts 100 including a restoring moment element comprising both torsion spring 112 (providing a first, counter-clockwise restoring moment) and torsion spring 114 (providing a second, clockwise restoring moment); however, for clarity, torsion springs 112, 114 are each shown separately with solar panel mount 100 in FIGS. 2-5.

Referring to FIGS. 2 and 3, solar panel mount 100 may include a panel assembly 102 rotatably mounted to support structure 32 by a pivot 104 so that panel assembly 102 may be pivotable about a pivot axis 106. In some example embodiments, pivot 104 may include one or more shafts, rolling element bearings, bushings, etc. to accommodate expected loads and/or minimize friction when panel assembly 102 is tilted.

In some example embodiments according to at least some aspects of the present disclosure, an example solar panel mount 100 may be configured to accommodate tilting of panel assembly 102 between various angular positions, such as between a first angular position (e.g., a summer angular position) and/or a second angular position (e.g., a winter angular position). Angle 40 indicates an angle of inclination of solar array 12 above horizontal. In one example embodiment, angle 40 may be about 12 degrees in the first angular position and/or angle 40 may be about 60 degrees in the second angular position. Angle 40 may be at a nominal angle β between the first angular position and the second angular position, such as at a nominal angle β of about 36 degrees. In some example embodiments, nominal angle (3 may correspond to a spring and/or fall angular position.

In some example embodiments, panel assembly 102 may include a solar panel carrier 108 and/or solar panel array 12. Solar panel array 12 may be attached to solar panel carrier 108 using fasteners appropriate for the solar panels 14, 16, 18, 20 comprising solar panel array 12, such as clips or other retainers specified by the manufacturer of solar panels 14, 16, 18, 20. In some example embodiments, solar panel carrier 108 may include various support members to hold solar panel array 12, such as generally horizontally extending, lateral support members partially visible in FIG. 1.

In some example embodiments, solar panel array 12 may be positioned on solar panel carrier 108 such that a center of gravity 110 of panel assembly 102 is located substantially vertically directly above pivot axis 106 when solar panel array 12 is inclined so that angle 40 is at about nominal angle β. That is, at nominal angle β, center of gravity 110 may be substantially vertically aligned with pivot axis 106, and the center of gravity 110 may be offset from the pivot axis 106 by a distance F'.

In some example embodiments, as panel assembly 102 is rotated clockwise about pivot axis 106, thereby further inclining panel array 12 (e.g., increasing angle 40 above nominal angle β), center of gravity 110 of panel assembly 102 may be displaced horizontally with respect to pivot axis 106 (e.g., to the right in FIGS. 2 and 3). That is, as panel assembly 102 is rotated clockwise from nominal angle β, center of gravity 110 of panel assembly 102 may be no longer located vertically directly above pivot axis 106. Accordingly, when angle 40 is greater than nominal angle (3, gravity acting on the panel assembly 102 may cause a clockwise gravitational moment on panel assembly 102.

In some example embodiments, as panel assembly 102 is rotated counter-clockwise about pivot axis 106, thereby reducing the inclination of panel array 12 (e.g., decreasing angle 40 below nominal angle β), center of gravity 110 of panel assembly 102 may be displaced horizontally with respect to pivot axis 106 (e.g., to the left in FIGS. 2 and 3). That is, as panel assembly 102 is rotated counter-clockwise from nominal angle β, center of gravity 110 of panel assembly 102 may be no longer located vertically directly above pivot axis 106. Accordingly, when angle 40 is less than nominal angle β, gravity acting on the panel assembly 102 may cause a counter-clockwise gravitational moment on panel assembly 102.

Figure 4:
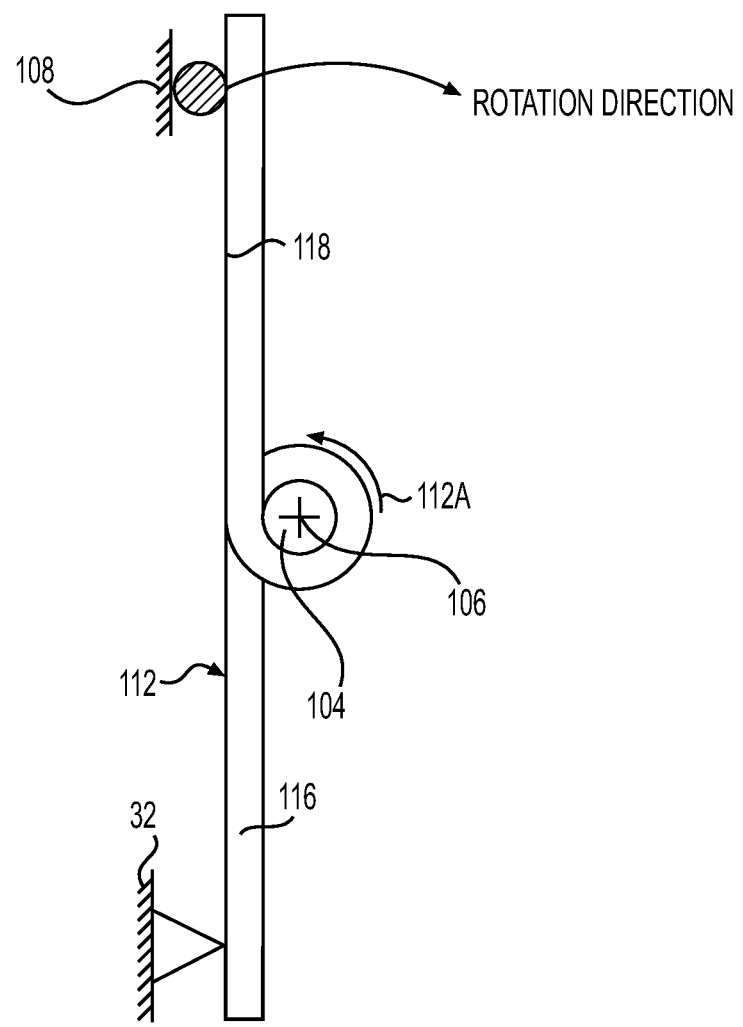
FIG. 4 is a detailed side elevation view of example torsion spring providing a counter-clockwise restoring moment.

FIG. 4 is a detailed side elevation view of example torsion spring 112 providing a counter-clockwise restoring moment 112A, according to at least some aspects of the present disclosure. Referring to FIGS. 2 and 4, in some example embodiments, torsion spring 112 may be a helical torsion spring, which may include a first leg 116 and/or a second leg 118. Torsion spring 112 may be disposed around pivot axis 106 such that first leg 116 is disposed on support structure 32 and/or second leg 118 is disposed on panel carrier 108, such as against a pin or bolt (which may apply force T shown in FIG. 2). As panel assembly 102 is further inclined from nominal angle β (e.g., increasing angle 40), panel carrier 108 may rotate clockwise about pivot axis 106, thereby causing second leg 118 of torsion spring 112 to deflect clockwise. Accordingly, torsion spring 112 may exert a restoring moment between support structure 32 and panel carrier 108 about pivot axis 106 in the counter-clockwise direction.

In some example embodiments, torsion spring 112 may be selected such that at any angular position between nominal angle β and the second angular position, the magnitude of the restoring moment exerted by spring 112 may approximately equal the magnitude of the gravitational moment of panel assembly 102. In some example embodiments, when angle 40 of panel assembly 102 is at about nominal angle β, the moment exerted by torsion spring 112 may be about zero. That is, at about nominal angle β, torsion spring 112 may be substantially relaxed. At angles less than nominal angle β, panel carrier 108 may rotate such that it is disengaged from second leg 118 and/or torsion spring 112 may not exert a restoring moment at angles less than nominal angle β.

Figure 5:
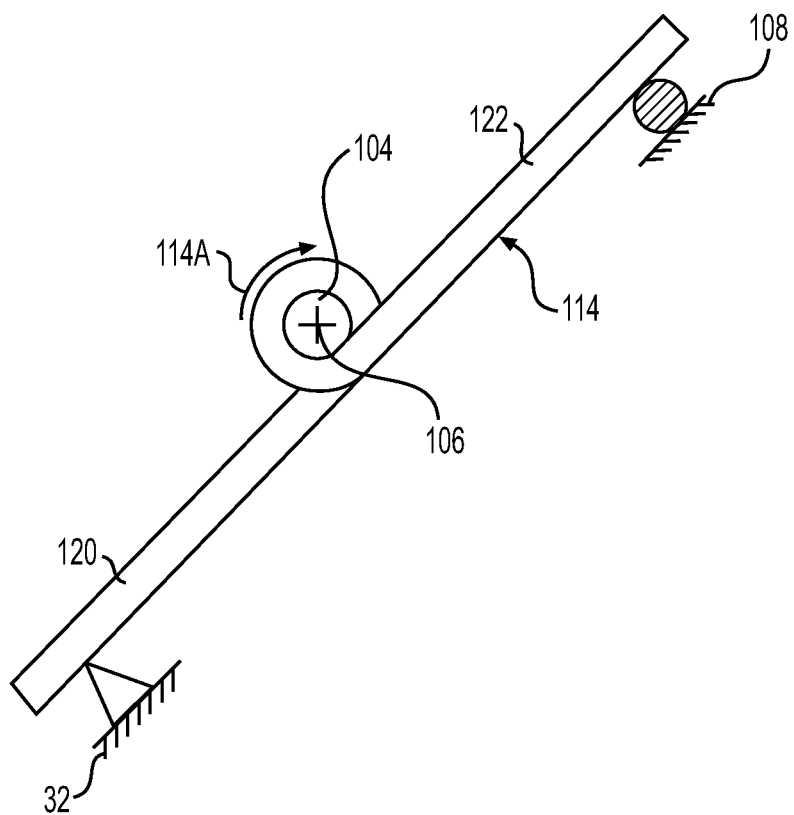
FIG. 5 is a detailed side elevation view of example torsion spring providing a clockwise restoring moment.

FIG. 5 is a detailed side elevation view of example torsion spring 114 providing a clockwise restoring moment 114A, according to at least some aspects of the present disclosure. Referring to FIGS. 3 and 5, in some example embodiments, torsion spring 114 may be a helical torsion spring, which may include a first leg 120 and/or a second leg 122. Torsion spring 114 may be disposed around pivot axis 106 such that first leg 120 is disposed on support structure 32 and/or second leg 122 is disposed on panel carrier 108, such as against a pin or bolt (which may apply force S shown in FIG. 3). As panel assembly 102 is tilted to reduce the inclination of panel array 12 from nominal angle β (e.g., decreasing angle 40), panel carrier 108 may rotate counter-clockwise about pivot axis 106, thereby causing second leg 122 of torsion spring 114 to deflect counter-clockwise. Accordingly, torsion spring 114 may exert a restoring moment between support structure 32 and panel carrier 108 about pivot axis 106 in the clockwise direction.

In some example embodiments, torsion spring 114 may be selected such that at any angular position between the first angular position and nominal angle β the magnitude of the restoring moment exerted by torsion spring 114 approximately equals the magnitude of the gravitational moment on panel assembly 102. In some example embodiments, when angle 40 of panel assembly 102 is at about nominal angle β, the moment exerted by torsion spring 114 may be about zero. That is, at about nominal angle β, torsion spring 114 may be substantially relaxed. At angles greater than nominal angle β, panel carrier 108 may rotate such that it is disengaged from second leg 122 and/or torsion spring 114 may not exert a restoring moment at angles greater than nominal angle β.

In the example embodiment shown in FIGS. 2-5, assuming that the solar panel assembly 102 weighs about 300 pounds, torsion springs 112, 114 having spring constants of about 37.7 inch-pounds/degree provide restoring moments approximately counteracting the gravitational moments throughout a range of angular positions from about 12 degrees to about 60 degrees. Thus, the external force or moment required to tilt panel assembly 102 is about equal to that which is required to overcome friction in pivot 104.

Figure 6:
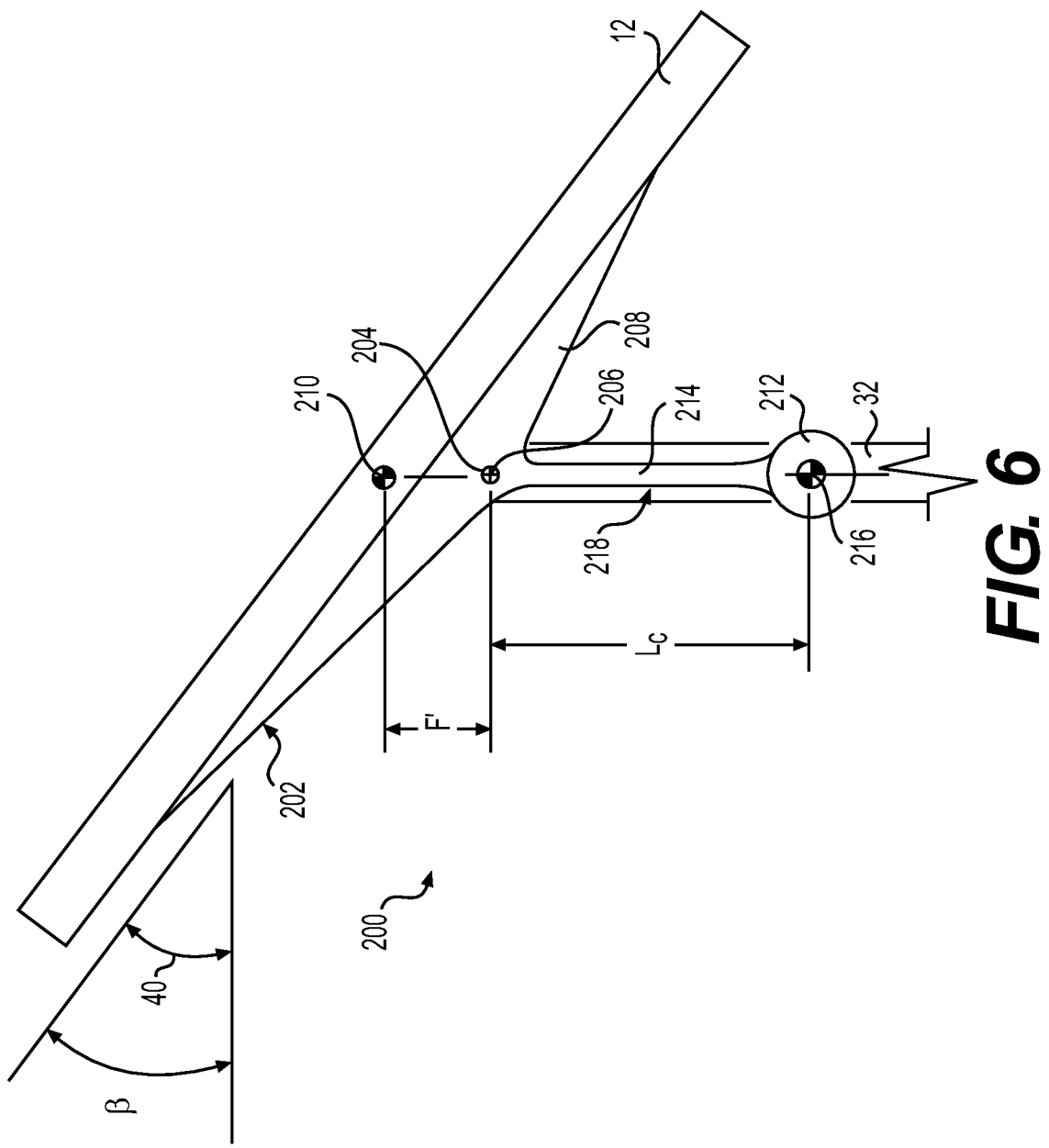
FIG. 6 is a side elevation view of an example solar panel mount including a counterweight assembly.

FIG. 6 is a side elevation view of an alternative example solar panel mount 200 including a restoring moment element, such as a counterweight assembly 218, providing a restoring moment, according to at least some aspects of the present disclosure. Solar panel mount 200 may be generally similar to solar panel mount 100 in construction and/or operation, and the following description of solar panel mount 200 focuses on some of the differences. Solar panel mount 200 may be utilized in solar panel installation 10 (FIG. 1).

In some example embodiments, solar panel mount 200 may include a panel assembly 202 rotatably mounted to support structure 32 by a pivot 204 so that panel assembly 202 may be pivotable about a pivot axis 206. In some example embodiments, pivot 204 may include one or more shafts, rolling element bearings, bushings, etc. to accommodate expected loads and/or minimize friction when panel assembly 202 is tilted. Solar panel mount 200 may be configured to accommodate tilting of panel assembly 202 between various angular positions, indicated by angle 40. Panel assembly 202 may include a solar panel carrier 208 and/or solar panel array 12. In some example embodiments, solar panel array 12 may be positioned on solar panel carrier 208 such that a center of gravity 210 of panel assembly 202 is substantially vertically aligned with pivot axis 106 when angle 40 is at about nominal angle β.

In some example embodiments according to at least some aspects of the present disclosure, counterweight assembly 218 of solar panel mount 200 may include an arm 214 extending from solar panel carrier 208 and supporting a counterweight 212. In the example embodiment shown in FIG. 6, when angle 40 is at about nominal angle β, arm 214 may extend substantially vertically downward from pivot axis 206. A center of gravity 216 of counterweight assembly 218 (e.g., arm 214 and counterweight 212 together) may be disposed substantially vertically aligned with pivot axis 206 at a distance $L_C$. In some example embodiments, arm 214 and/or counterweight 212 may be integrally formed with panel carrier 208. In some example embodiments, panel carrier 208, arm 214, and/or counterweight 212 may include separate pieces that may be releasably or permanently attached to one another, such as by bolting, welding, riveting, pinning, etc.

In some example embodiments, as panel assembly 202 is rotated clockwise about pivot axis 206, thereby further inclining panel array 12 (e.g., increasing angle 40 above nominal angle β), center of gravity 210 of panel assembly 202 may be displaced horizontally with respect to pivot axis 206 (e.g., to the right in FIG. 6). That is, as panel assembly 202 is rotated clockwise from nominal angle β, center of gravity 210 of panel assembly 202 may be no longer located vertically directly above pivot axis 206. Accordingly, when angle 40 is greater than nominal angle β, gravity acting on the panel assembly 202 may cause a clockwise gravitational moment on panel assembly 202.

In some example embodiments, as panel assembly 202 is rotated clockwise about pivot axis 206, center of gravity 216 of counterweight assembly 218 may be displaced horizontally with respect to pivot axis 206 (e.g., to the left in FIG. 6). That is, as panel assembly 202 is rotated clockwise from nominal angle β, center of gravity 216 of counterweight assembly 218 may be no longer located vertically directly below pivot axis 206. Accordingly, when angle 40 is greater than nominal angle β, gravity acting on the counterweight assembly 218 may exert a first, counter-clockwise restoring moment on panel assembly 202.

Likewise, in some example embodiments, as panel assembly 202 is rotated counter-clockwise about pivot axis 206, thereby reducing the inclination of panel array 12 (e.g., decreasing angle 40 below nominal angle β), center of gravity 210 of panel assembly 202 may be displaced horizontally with respect to pivot axis 206 (e.g., to the left in FIG. 6). That is, as panel assembly 202 is rotated counter-clockwise from nominal angle β, center of gravity 210 of panel assembly 202 may be no longer located vertically directly above pivot axis 206. Accordingly, when angle 40 is less than nominal angle β, gravity acting on the panel assembly 202 may cause a counter-clockwise gravitational moment on panel assembly 202.

Likewise, in some example embodiments, as panel assembly 202 is rotated counter-clockwise about pivot axis 206, center of gravity 216 of counterweight assembly 218 may be displaced horizontally with respect to pivot axis 206 (e.g., to the right in FIG. 6). That is, as panel assembly 202 is rotated counter-clockwise from nominal angle β, center of gravity 216 of counterweight assembly 218 may be no longer located vertically directly below pivot axis 206. Accordingly, when angle 40 is less than nominal angle β, gravity acting on the counterweight assembly 218 may exert a second, clockwise restoring moment on panel assembly 202.

In some example embodiments, the length and arrangement of arm 214 and the mass of counterweight 212 may be selected such that, at any angle between a first angular position and a second angular position, counterweight assembly 218 exerts a restoring moment approximately equal in magnitude and opposite in direction to the gravitational moment of panel assembly 202.

In the example embodiment shown in FIG. 6, assuming that the solar panel assembly 202 weighs about 300 pounds, a counterweight weighing about 40.7 pounds mounted on arm 214 so that distance $L_C$ is about 22.26 inches provides restoring moments approximately counteracting the gravitational moments of panel assembly 202 throughout a range of angular positions from about 12 degrees to about 60 degrees.

Figure 7:
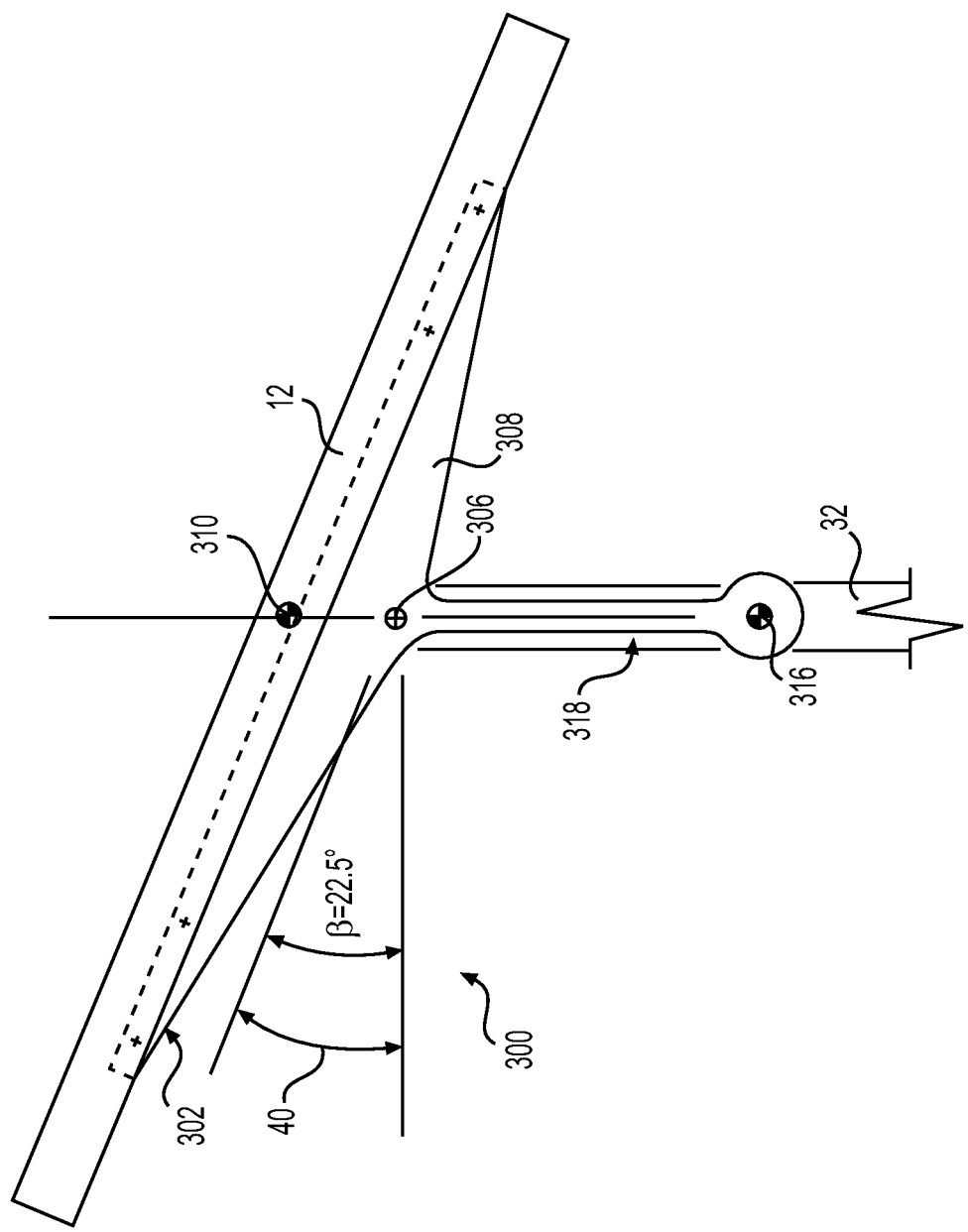
FIG. 7 is a side elevation view of an example solar panel mount including a counterweight assembly configured for use at about 25 degrees latitude.

FIG. 7 is a side elevation view of an example solar panel mount 300 including a counterweight assembly 318 providing a restoring moment and configured for use at about 25 degrees latitude, according to at least some aspects of the present disclosure. Solar panel mount 300 may be generally similar to solar panel mount 200 in construction and/or operation, and the following description of solar panel mount 300 focuses on some of the differences. Solar panel mount 300 may be utilized in solar panel installation 10 (FIG. 1) and may be configured for use at lower latitudes (e.g., about 25 degrees) than solar panel mount 200.

In some example embodiments, nominal angle β may be about 22.5 degrees versus about 36 degrees for solar panel mount 200. Accordingly, when angle 40 is about 22.5 degrees, center of gravity 310 of panel assembly 302 (including solar panel carrier 308 and solar panel array 12) and/or center of gravity 316 of counterweight assembly 318 may be substantially vertically aligned with pivot axis 306.

Figure 8:
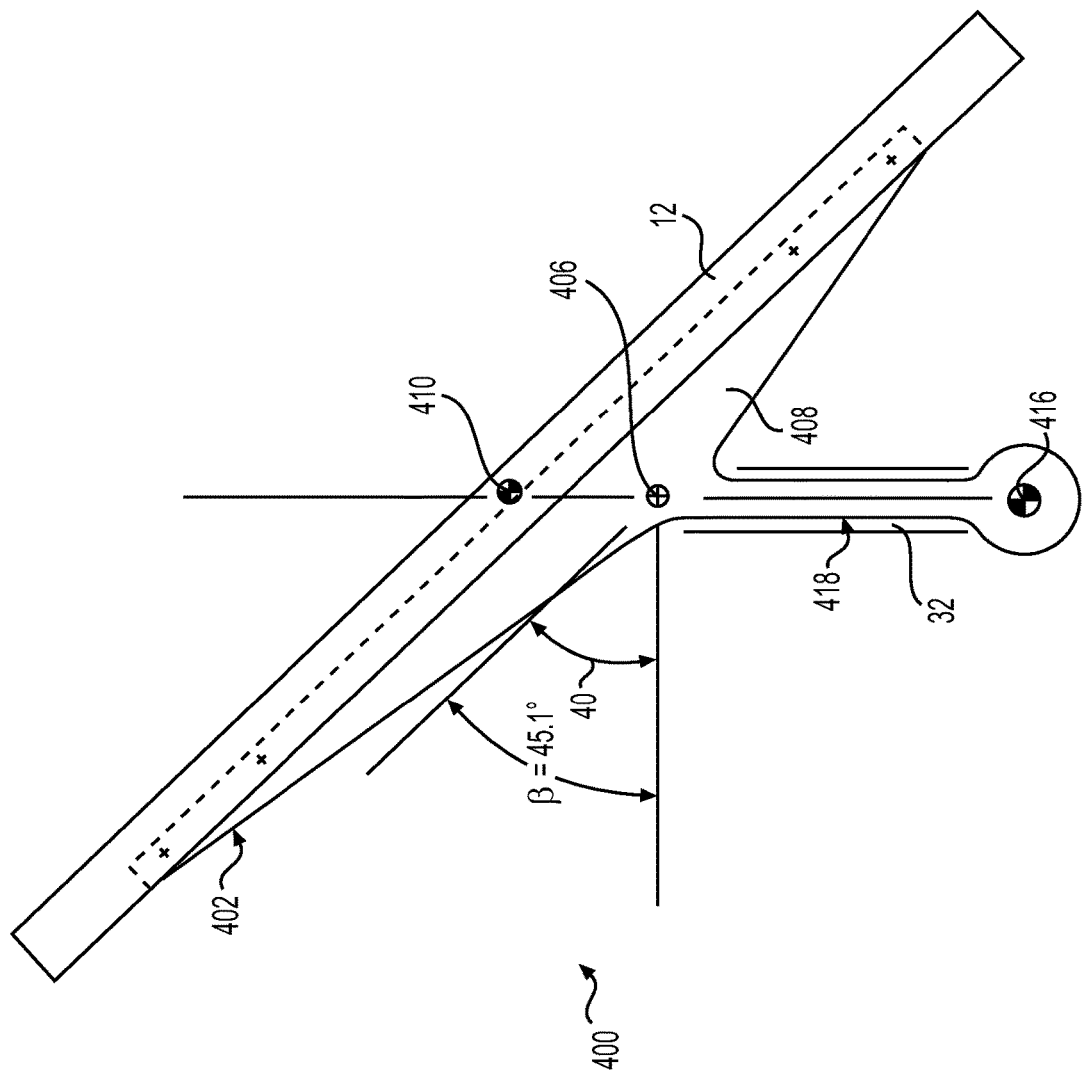
FIG. 8 is a side elevation view of an example solar panel mount including a counterweight assembly configured for use at about 50 degrees latitude.

FIG. 8 is a side elevation view of an example solar panel mount 400 including a counterweight assembly 418 providing a restoring moment and configured for use at about 50 degrees latitude, according to at least some aspects of the present disclosure. Solar panel mount 400 may be generally similar to solar panel mount 200 in construction and/or operation, and the following description of solar panel mount 400 focuses on some of the differences. Solar panel mount 400 may be utilized in solar panel installation 10 (FIG. 1) and may be configured for use at higher latitudes (e.g., about 50 degrees) than solar panel mount 200.

In some example embodiments, nominal angle β may be about 45.1 degrees versus about 36 degrees for solar panel mount 200. Accordingly, when angle 40 is about 45.1 degrees, center of gravity 410 of panel assembly 402 (including solar panel carrier 408 and solar panel array 12) and/or center of gravity 416 of counterweight assembly 418 may be substantially vertically aligned with pivot axis 406.

Figure 9:
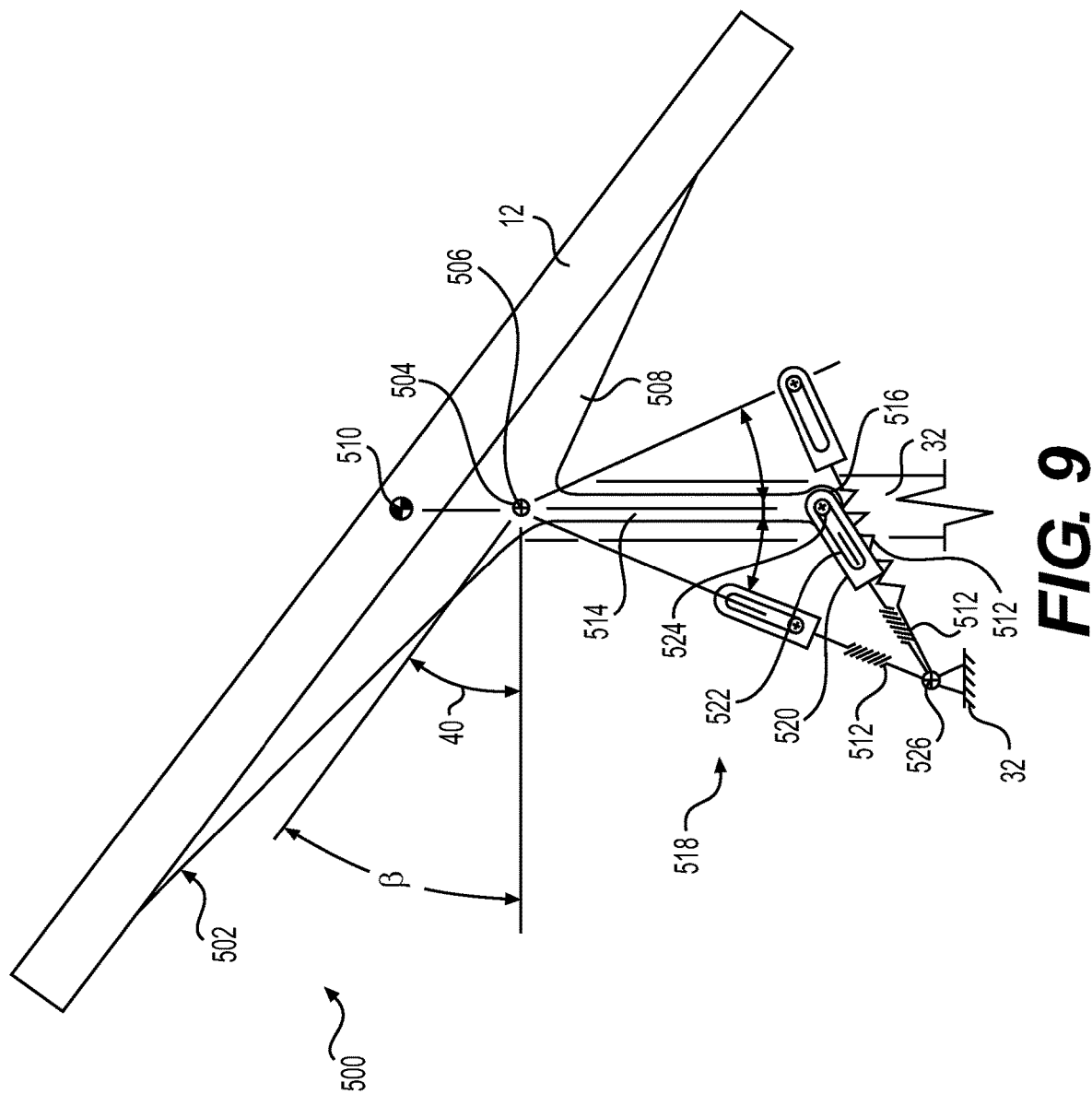
FIG. 9 is a side elevation view of an example solar panel mount including a linear extension spring.

FIG. 9 is a side elevation view of an example solar panel mount 500 including a restoring moment element, such as a linear extension spring 512, providing a first, clockwise restoring moment, according to at least some aspects of the present disclosure. In some example embodiments, solar panel mount 500 may be generally similar to solar panel mount 100 in construction and/or operation, and the following description of solar panel mount 500 focuses on some of the differences. Solar panel mount 500 may be utilized in solar panel installation 10 (FIG. 1).

In FIG. 9, extension spring 512 and related components are shown in three positions corresponding to the winter angular position (left-most position in FIG. 9), nominal angle β position (center position in FIG. 9), and summer angular position (right-most position in FIG. 9). Some example embodiments may include a substantially similar extension spring and related components arranged in a generally mirror-image configuration to exert a second, counter-clockwise restoring moment; however, for clarity this is not shown in FIG. 9.

In some example embodiments, solar panel mount 500 may include a panel assembly 502 rotatably mounted to support structure 32 by a pivot 504 so that panel assembly 502 may be pivotable about a pivot axis 506. In some example embodiments, pivot 504 may include one or more shafts, rolling element bearings, bushings, etc. to accommodate expected loads and/or minimize friction when panel assembly 502 is tilted. Solar panel mount 500 may be configured to accommodate tilting of panel assembly 502 between various angular positions, indicated by angle 40. Panel assembly 502 may include a solar panel carrier 508 and/or solar panel array 12. In some example embodiments, solar panel array 12 may be positioned on solar panel carrier 508 such that a center of gravity 510 of panel assembly 502 is substantially vertically aligned with pivot axis 506 when angle 40 is at about nominal angle β.

In some example embodiments according to at least some aspects of the present disclosure, a linear extension spring assembly 518 of solar panel mount 500 may include an arm 514 extending from solar panel carrier 508 having a coupler 520 movably disposed thereon, such as near a distal end 516 of arm 514. Coupler 520 may include a slot 522 configured to receive a traveler 524 slidably and/or rotatably therein. Traveler 524 may be generally in the form of a pin extending from arm 514. Extension spring 512 may extend between an anchor 526 (which may be disposed on supporting structure 32) and coupler 520.

In some example embodiments, extension spring 512 may be substantially retracted (e.g., exerting substantially no tensile force) on coupler 520 when angle 40 is at about nominal angle β. As panel assembly 502 is rotated counter-clockwise about pivot axis 506 reducing the inclination of panel array 12 (e.g., decreasing angle 40 below nominal angle β), arm 514 may rotate so that distal end 516 of arm 514 moves away from anchor 526, thereby extending extension spring 512. Accordingly, when angle 40 is less than nominal angle β, the tensile force of extension spring 512 may act on arm 514 to exert a clockwise restoring moment on panel assembly 502.

In some example embodiments, extension spring 512 may be substantially retracted (e.g., exerting substantially no tensile force) on coupler 520 when angle 40 is greater than or equal to about nominal angle β. In some example embodiments, as panel assembly 502 is rotated clockwise about pivot axis 506 increasing the inclination of panel array 12 (e.g., increasing angle 40 above nominal angle β), arm 514 may rotate so that distal end 516 of arm 514 moves closer to anchor 526. Traveler 524 may slide within slot 522 towards extension spring 512, which may prevent compression and/or buckling of extension spring 512. Likewise, as panel assembly 512 is rotated counter-clockwise from an angle 40 greater than nominal angle β, traveler 524 may slide within slot 522 away from extension spring 512 until angle 40 is at about nominal angle β. Then, traveler 524 reaches the position in slot 522 farthest from extension spring 512 and further counter-clockwise rotation of panel assembly 502 results in extension of extension spring 512 as described above.

In some example embodiments, linear extension spring assembly 518 may be configured such that at any angular position between nominal angle β and the summer angular position, the restoring moment exerted by linear extension spring assembly 518 approximately counteracts the gravitational moment of panel assembly 502. In some example embodiments according to at least some aspects of the present disclosure, opposed linear springs may be configured to exert a reasonable restoring moment as the panel assembly is moved from the mid position to the extreme angles. The present disclosure contemplates, however, that the restoring moment may differ in magnitude from the gravitational moment over the range of angular positions more than in some example embodiments including torsion springs.

In some example embodiments including opposed extension springs (e.g., linear extension spring 512 providing a clockwise restoring moment and a substantially similar extension spring and related components arranged in a generally mirror-image configuration to exert a counter-clockwise restoring moment), as panel assembly 502 is tilted, one spring may be extended while the other spring may remain in a retracted state. The slots may allow rotation of arm 514 towards the retracted spring while preventing compression of the retracted spring.

Figure 10:
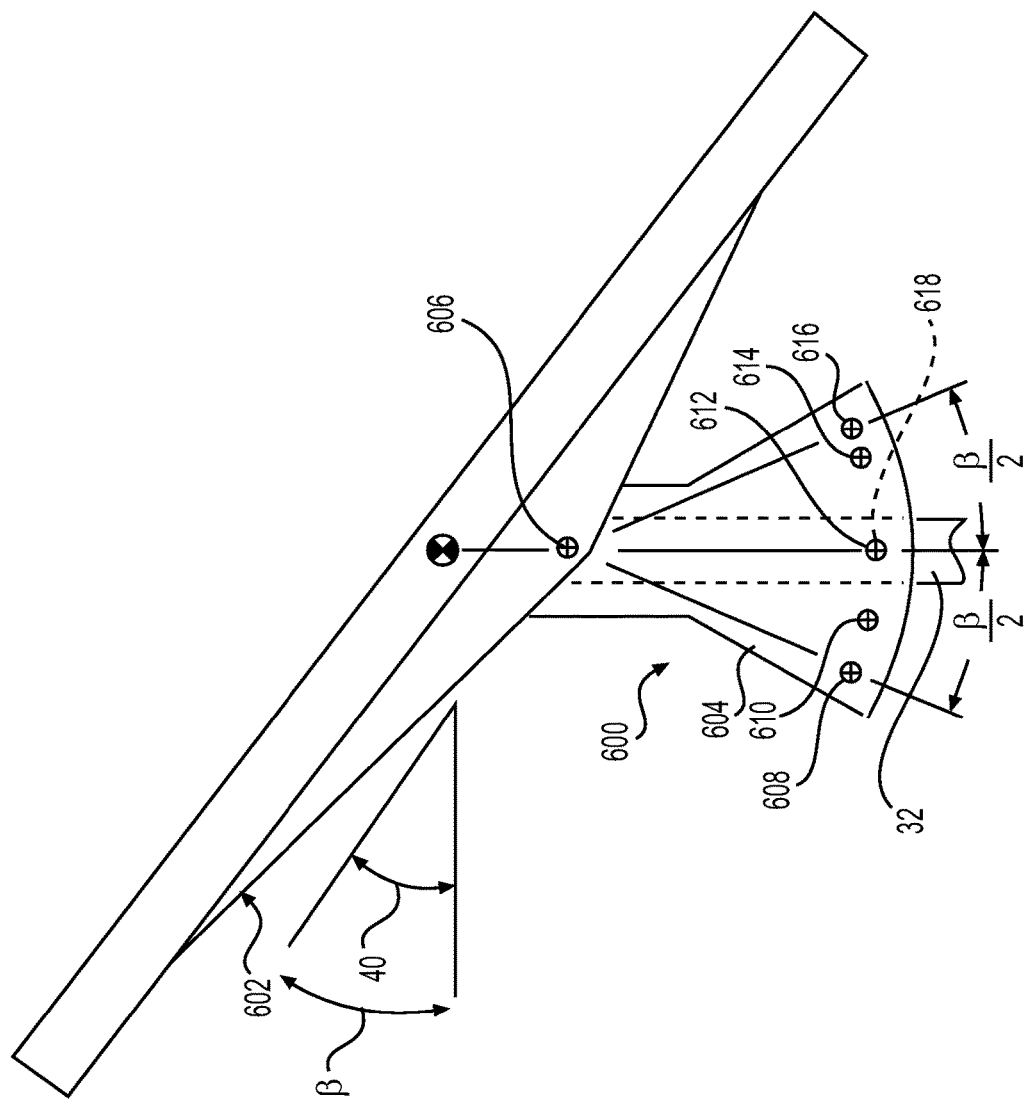
FIG. 10 is a side elevation view of an example angular position lock.

FIG. 10 is a side elevation view of an example angular position lock 600, according to at least some aspects of the present disclosure. Lock 600 may be utilized in connection with any example solar panel mount described herein and may be utilized in solar panel installation 10 (FIG. 1). Lock 600 may include a plate 604 attached to rotate with a panel assembly 602 about pivot axis 606. Plate 604 may include a plurality of holes 608, 610, 612, 614, 616 which may be arranged to align with a corresponding hole 618 disposed on supporting structure 32 at various angles 40. When one of holes 608, 610, 612, 614, 616 and hole 618 are aligned, a fastener such as a bolt or pin may be inserted therethrough to secure panel assembly 602 at that angular position. In some example embodiments, hole 608 may be associated with a summer angular position and/or hole 616 may be associated with a winter angular position.

Figure 11:
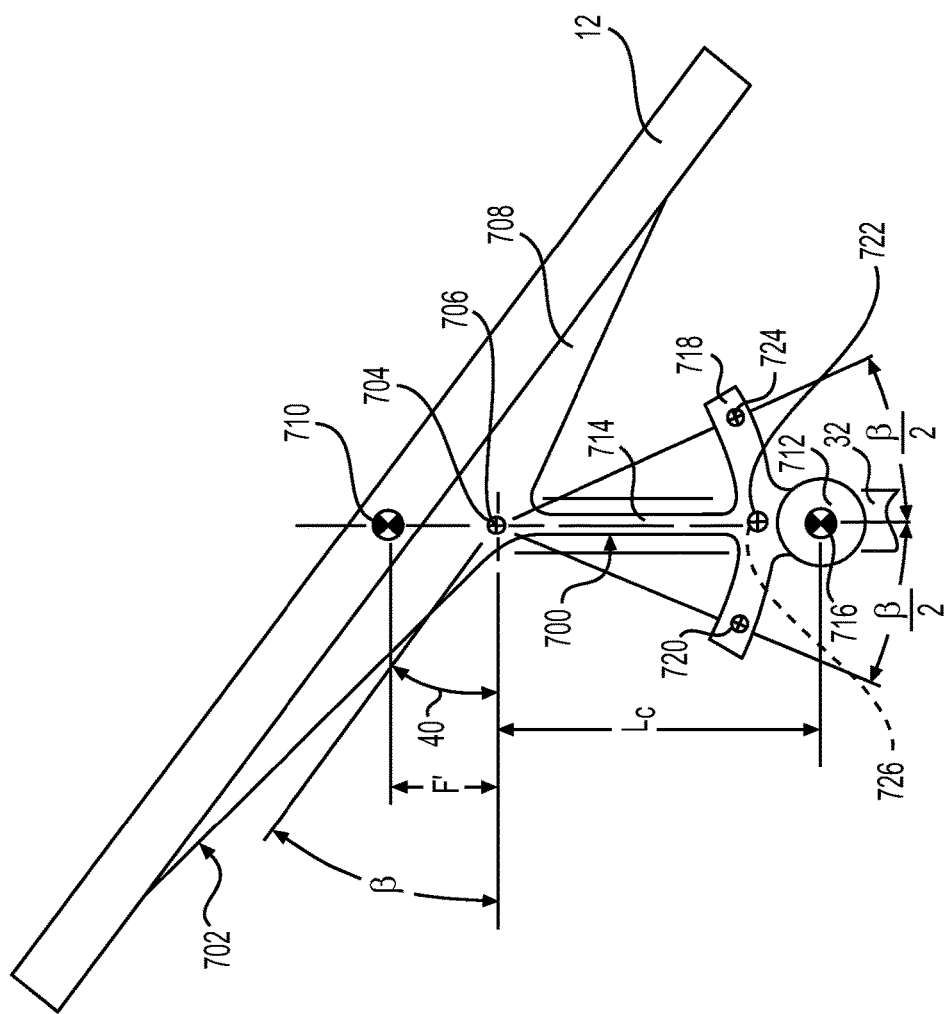
FIG. 11 is a side elevation view of an example combined counterweight and lock assembly.

FIG. 11 is a side elevation view of an example combined counterweight and lock assembly 700, according to at least some aspects of the present disclosure. Some example embodiments including counterweight and lock assembly 700 may be generally similar to solar panel mount 200 and lock 600 in construction and/or operation (e.g., providing restoring moments and securing the panels at a particular angle), and the following description of counterweight and lock assembly 700 focuses on some of the differences. Counterweight and lock assembly 700 may be utilized in solar panel installation 10 (FIG. 1).

In some example embodiments, counterweight and lock assembly 700 may be disposed on a panel assembly 702 rotatably mounted to support structure 32 by a pivot 704 so that panel assembly 702 may be pivotable about a pivot axis 706. Panel assembly 702 may be tiltable between various angular positions, indicated by angle 40. Panel assembly 702 may include a solar panel carrier 708 and/or solar panel array 12. In some example embodiments, solar panel array 12 may be positioned on solar panel carrier 708 such that a center of gravity 710 of panel assembly 702 is substantially vertically aligned with pivot axis 706 when angle 40 is at about nominal angle β.

In some example embodiments according to at least some aspects of the present disclosure, counterweight and lock assembly 700 may include an arm 714 extending from solar panel carrier 708 and supporting a counterweight 712. In the example embodiment shown in FIG. 11, when angle 40 is at about nominal angle β, arm 714 may extend substantially vertically downward from pivot axis 706. A locking plate 718 may be disposed on arm 714 and/or may include a plurality of holes 720, 722, 724, which may align with a hole 726 disposed on supporting structure 32 at various angles 40. When one of holes 720, 722, 724 and hole 726 are aligned, a fastener such as a bolt or pin may be inserted therethrough to secure panel assembly 702 at that angular position. In some example embodiments, hole 720 may be associated with a summer angular position and/or hole 724 may be associated with a winter angular position.

In some example embodiments, when panel assembly 702 is at about nominal angle β, a center of gravity 716 of counterweight and lock assembly 700 (e.g., arm 714, counterweight 712, and plate 718 together) may be disposed substantially vertically aligned with pivot axis 706. In some example embodiments, arm 714, counterweight 712, and/or plate 718 may be integrally formed with panel carrier 708. In some example embodiments, panel carrier 708, arm 714, counterweight 712, and/or plate 718 may include separate pieces that may be releasably or permanently attached to one another, such as by bolting, welding, riveting, pinning, etc.

Figure 12:
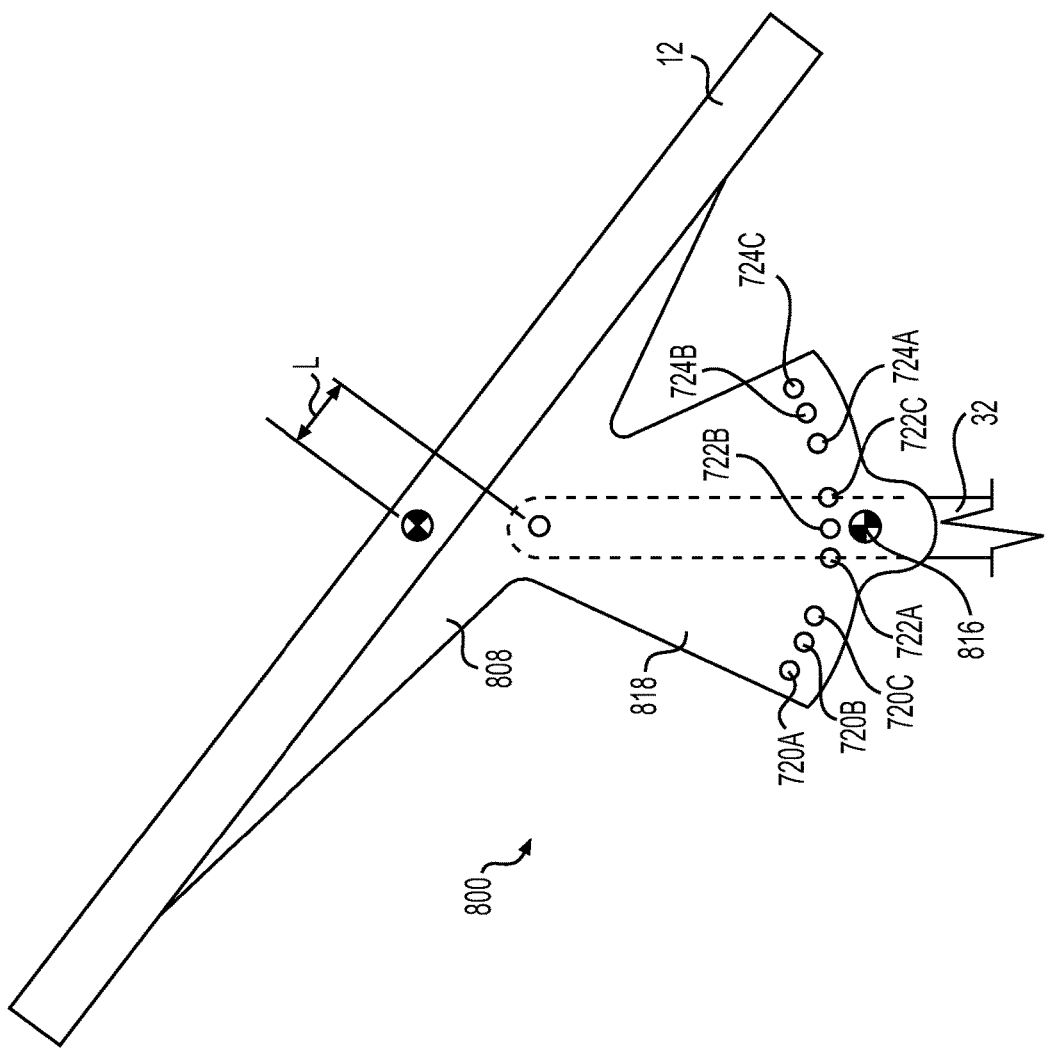
FIG. 12 is a side elevation view of an alternative example combined counterweight and lock assembly.

FIG. 12 is a side elevation view of an alternative example combined counterweight and lock assembly 800, according to at least some aspects of the present disclosure. Some example embodiments including counterweight and lock assembly 800 may be generally similar to solar counterweight and lock assembly 700 in construction and/or operation (e.g., providing restoring moments and securing the panels at a particular angle), and the following description of counterweight and lock assembly 800 focuses on some of the differences. Counterweight and lock assembly 800 may be utilized in solar panel installation 10 (FIG. 1).

In some example embodiments, counterweight and lock assembly 800 may include a locking plate 818 including a plurality of holes 720A, 720B, 720C, 722A, 722B, 722C, 724A, 724B, 724C, which may be positioned appropriately for a plurality of latitudes. Likewise, panel carrier 808 may be configured to receive solar panel array 12 at a plurality of positions corresponding to various latitudes (e.g., different offset mass distances L). Further, center of gravity 816 of counterweight and lock assembly 800 may be movable, such as by moving a bolt-on counterweight mass, to be positioned corresponding to various latitudes. Accordingly, counterweight and lock assembly 800 may be configured for use at a plurality of latitudes.

Figure 13:
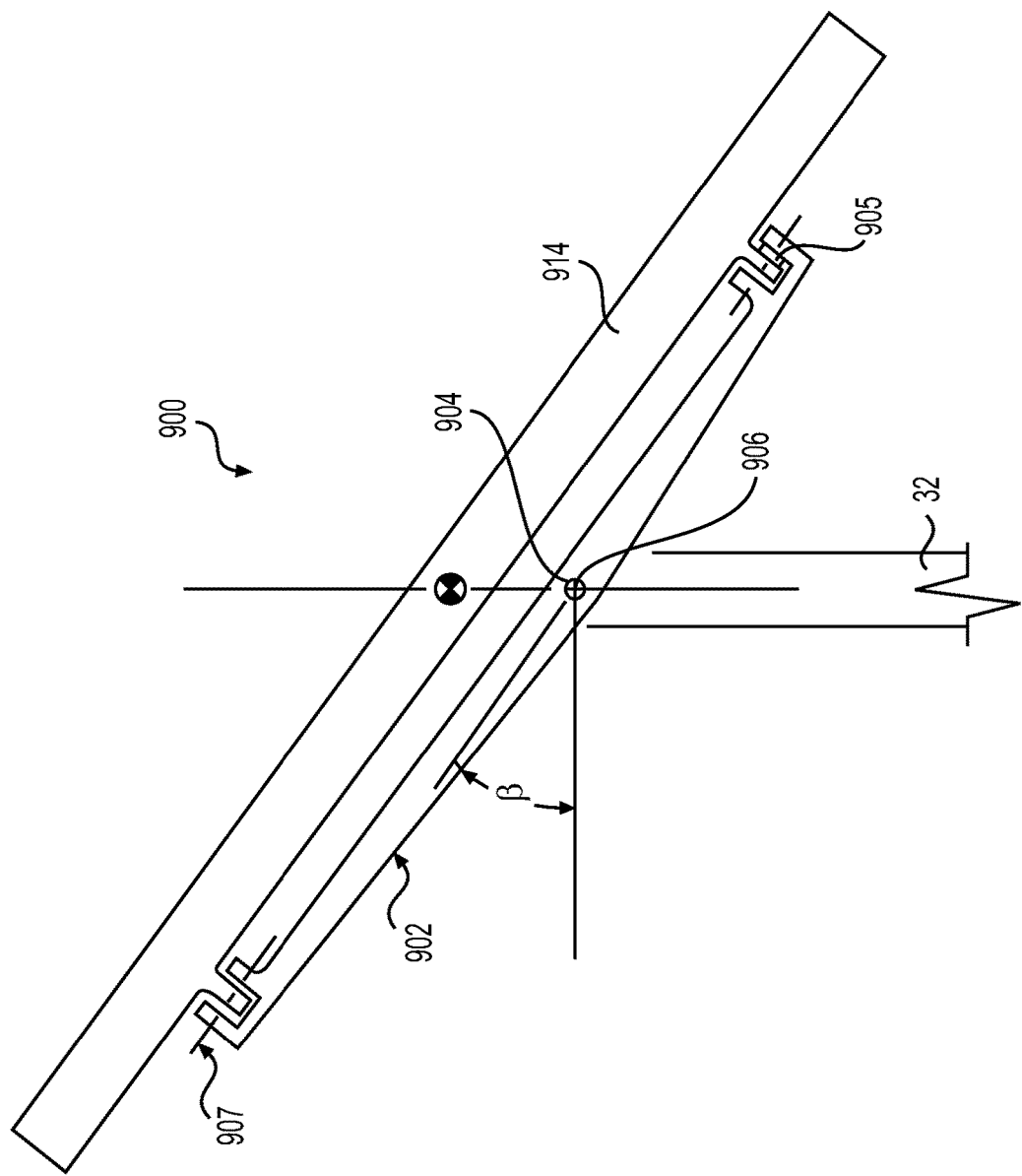
FIG. 13 is a side elevation view of an example two-axis solar panel mount for a single solar panel.
Figure 14:
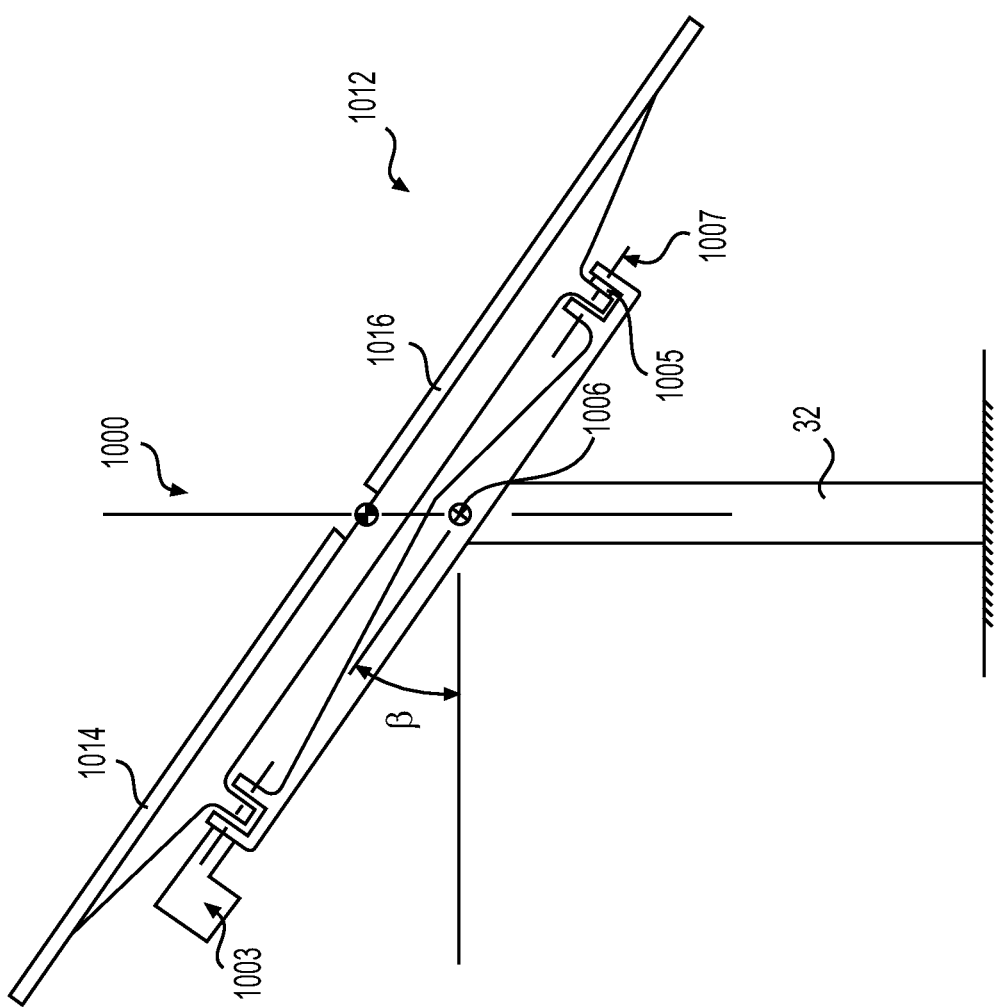
FIG. 14 is a side elevation view of an example two-axis solar panel mount for four solar panels.
Figure 15:
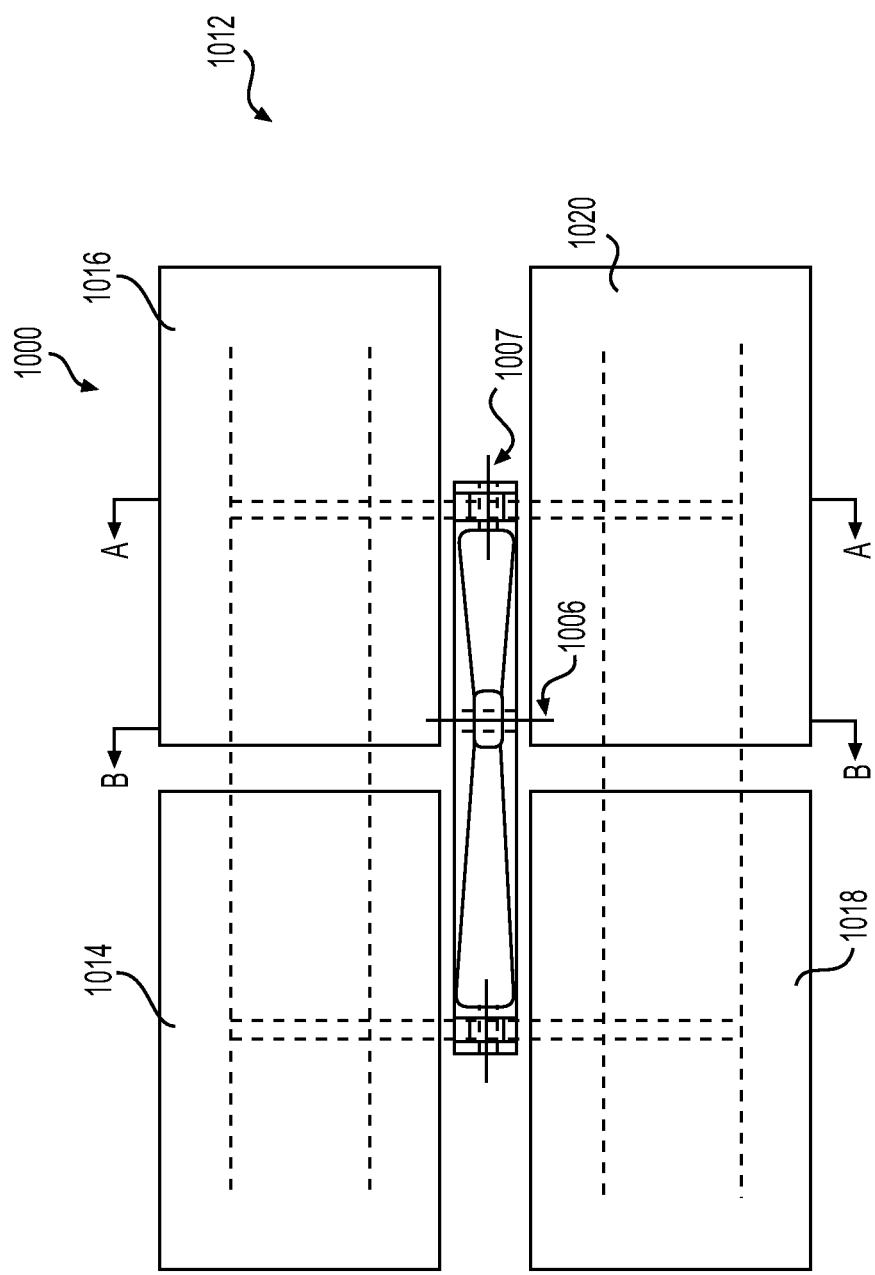
FIG. 15 is a plan view of the example two-axis solar panel mount of FIG. 14
Figure 16:
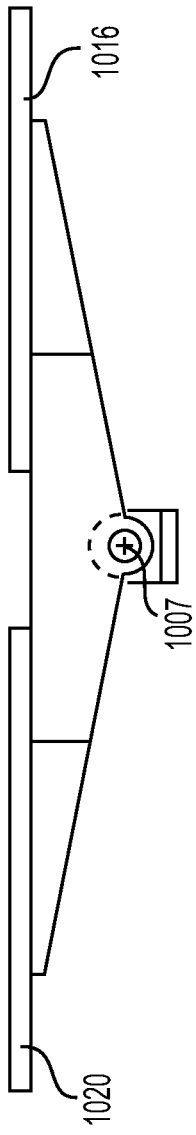
FIG. 16 is a section view at A-A in FIG. 15.
Figure 17:
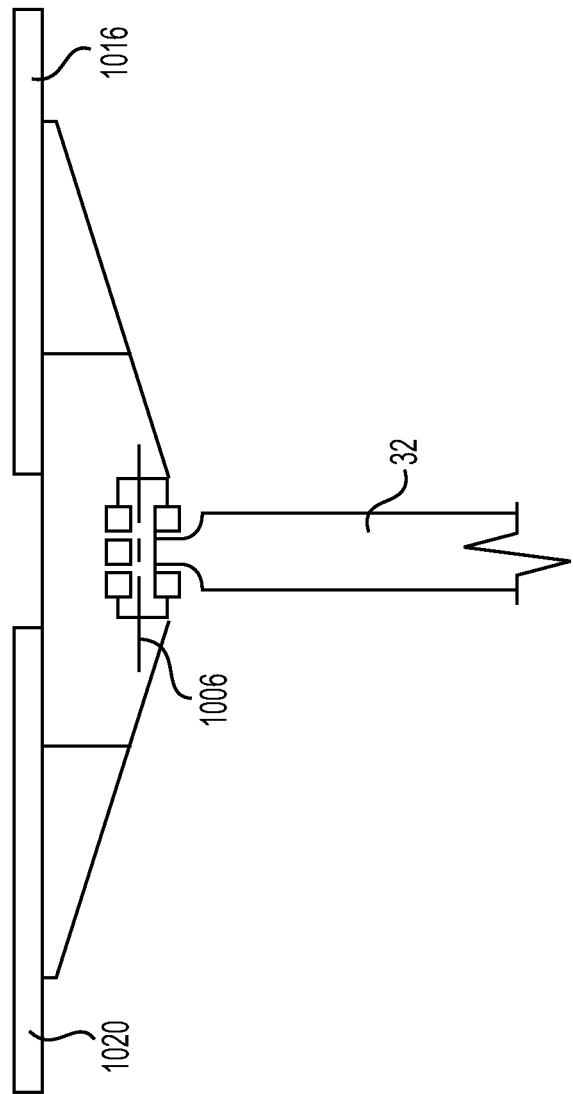
FIG. 17 is a section view at B-B in FIG. 15.

In some example embodiments according to at least some aspects of the present disclosure, some example solar panel mounts described herein may be utilized for both daily solar tracking from sunrise to sunset (e.g., East to West) as well as seasonal tilting (e.g., summer and winter angular positions). Accordingly, in some example embodiments, solar panel mounts as described herein may be configured to provide two-axis aiming of the solar panels. FIG. 13 is a side elevation view of an example two-axis solar panel mount 900 for a single solar panel 914, FIG. 14 is a side elevation view of an example two-axis solar panel mount 1000 for four solar panels 1014, 1016, 1018, 1020, and FIG. 15 is a plan view of the example two-axis solar panel mount 1000 of FIG. 14, all according to at least some aspects of the present disclosure. FIG. 16 is a section view at A-A in FIG. 15 and FIG. 17 is a section view at B-B in FIG. 15, all according to at least some aspects of the present disclosure.

In some example embodiments, for daily rotation (e.g., East to West), the solar panels and associated structure may be arranged such that the center of gravity is substantially aligned with the pivot point vertical axis when the panels are substantially horizontal (e.g., generally midway between East and West). The daily rotation may be +/−X degrees from this generally horizontal position.

In some example embodiments, generally as described for embodiments providing seasonal tilting, a twisting moment (e.g., gravitational moment) may be created as the center of gravity of the assembly is moved out of vertical alignment with the daily pivot axis. Generally similar to the seasonal tilting embodiments described above, some example daily rotation embodiments may include a pair of torsion springs, one for counteracting the counter-clockwise assembly rotation and the other for counteracting the clockwise assembly rotation. The springs may touch the panel support and/or may be reacted by the seasonal support (see, e.g., FIG. 14). By the use of torsional opposite opposing springs, the only force to overcome may be the friction load of the bushings or bearings at the daily pivot axis until the assembly is rotated from a generally horizontal seasonal angle to a desired seasonal angle using another degree of rotational freedom when the assembly is rotated about the seasonal pivot axis. This rotation may create a thrust load due to gravity along the daily rotation axis. A way of lessening the load may be to use a thrust washer or a ball bearing in one or more of the daily rotation support locations. An example thrust washer is shown in FIG. 13.

In some example embodiments, generally as described above for embodiments providing seasonal tilting, the panel and articulating support structure may be offset so that its center of gravity may substantially line up with the vertical seasonal rotational axis at the nominal seasonal position.

Referring to FIG. 13, an example two-axis solar panel mount 900 may include a panel assembly 902 rotatably mounted to support structure 32 by a seasonal pivot 904 disposed so that panel assembly 902 may be pivotable about seasonal pivot (rotation) axis 906. Generally, panel assembly 902 may be pivotable about seasonal pivot axis 906 in the manner described elsewhere herein for seasonal tilting of solar panels and may include various features as described elsewhere herein in connection with such operation. In some example embodiments, solar panel 914 may be pivotably disposed such that solar panel 914 may be pivoted (e.g., East-West) about a daily pivot (rotation) axis 907, which may be generally orthogonal to seasonal pivot axis 906. For example, one or more daily rotation pivots 905 may be provided.

Referring to FIGS. 14-17, an example two-axis solar panel mount 1000 for a multi-panel solar array 1012 comprising four solar panels 1014, 1016, 1018, 1020 may be configured generally similarly to the embodiment of FIG. 13 such that array 1012 is pivotable seasonally about a seasonal pivot axis 1006 and daily (e.g., East-West) about a daily pivot axis 1007. Seasonal pivot axis 1006 may be generally orthogonal to daily pivot axis 1007. Generally, panel assembly 1002 may be pivotable about seasonal pivot axis 1006 in the manner described elsewhere herein for seasonal tilting of solar panels and may include various features as described elsewhere herein in connection with such operation.

The present disclosure contemplates that for an even number of panels (e.g., 2, 4, 6, 8), it may be possible to place the daily pivot axis approximately at the center of gravity of the panels and panel support, which may reduce or eliminate the need for a counteracting twisting moment. But, it may be very difficult to then position the center of gravity at the seasonal pivot axis, which may necessitate a counteracting twisting moment device, such as some of the example embodiments described herein.

FIGS. 18A-18G are views illustrating alternative example arrangements of solar panels which may be used, for example, in connection with some two-axis solar panel mounts described herein, according to at least some aspects of the present disclosure.

Figure 20:
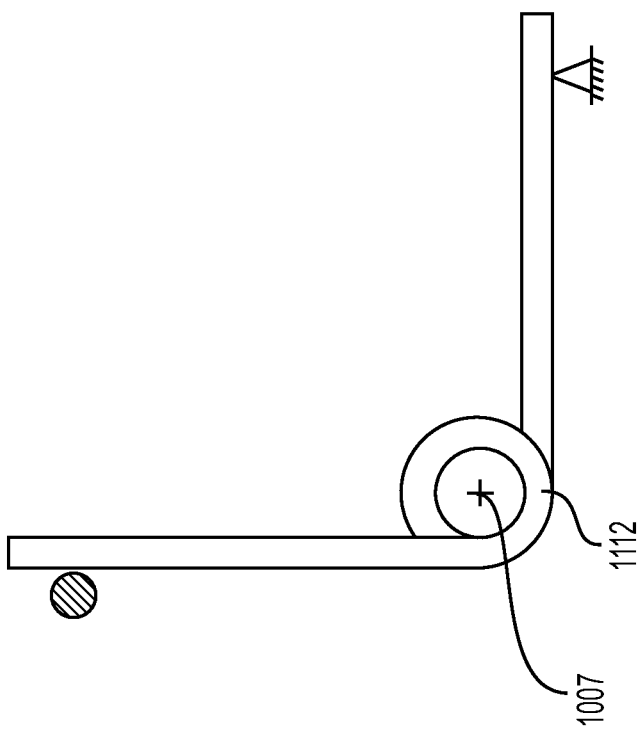
FIG. 20 is an elevation view of an example torsion spring; all in accordance with at least some aspects of the present disclosure.
Figure 19:
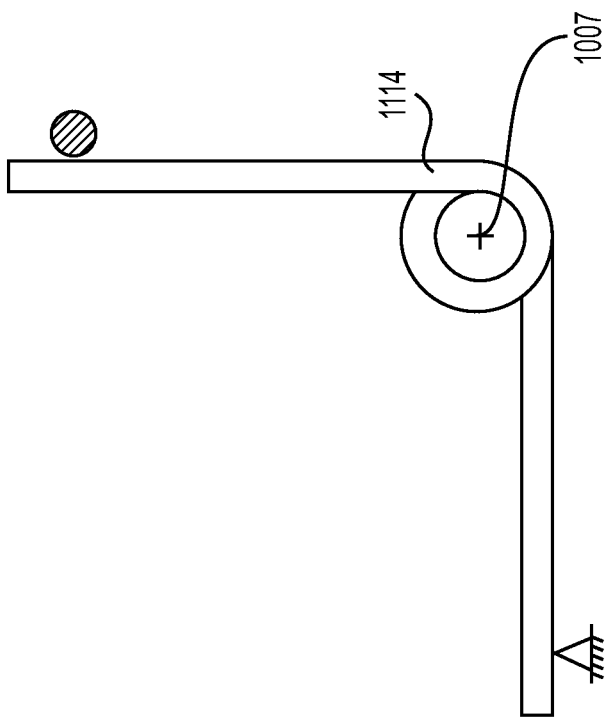
FIG. 19 is an elevation view of an example torsion spring.

FIGS. 19 and 20 are elevation views of example torsion springs 1112, 1114 that may be used in connection with some two-axis solar panel mounts described herein, according to at least some aspects of the present disclosure. Generally, torsion springs 1112, 1114 may operate similarly to torsion springs 112, 114 described above in connection with FIGS. 2-5, except that they may be used in connection with daily rotation. Torsion springs 1112, 1114, may be disposed about daily pivot axis 1007. When panel assembly 1002 is at its daily mid position (e.g., generally horizontal), torsion springs 1112, 1114 may be substantially relaxed. As panel assembly 1002 is pivoted clockwise, torsion spring 1112 may be deflected, thereby creating a counterclockwise restoring moment. Similarly, as panel assembly 1002 is pivoted counterclockwise, torsion spring 1114 may be deflected, thereby creating a clockwise restoring moment. Torsion springs 1112, 1114 may be selected (e.g., spring constant) and/or arranged to exert restoring moments on panel assembly 1002 about daily pivot axis 1007 that approximately equal the magnitude of the gravitational moment on panel assembly 1002 due to rotation about daily pivot axis 1007. Accordingly, the external force or moment required to pivot panel assembly 1002 about daily pivot axis 1007 may be about equal to that which is required to overcome friction in pivot 1005.

Example methods of installing solar arrays according to at least some aspects of the present disclosure are described. An example method may include disposing a pivot (e.g., pivot 104) of a solar panel mount (e.g., solar panel mount 100) on a support structure (e.g., support structure 32). The pivot may pivotably secure a solar panel carrier (e.g., solar panel carrier 108) to the support structure so that the solar panel carrier is tiltable about a pivot axis (e.g., pivot axis 106) between a first angular position and a second angular position. When a solar array (e.g., solar array 12) is disposed on the solar panel carrier, the solar array and the panel carrier may form a panel assembly (e.g., panel assembly 102). When the solar panel carrier is at a nominal angular position between the first angular position and the second angular position, a center of gravity (e.g., center of gravity 110) of the panel assembly may be above and substantially vertically aligned with the pivot axis. The solar panel mount may comprise a restoring moment element (e.g., torsion springs 112, 114) operatively connected to the solar panel carrier and configured to exert a restoring moment on the solar panel carrier opposite in direction and approximately equal in magnitude to a gravitational moment of the panel assembly when the solar panel carrier is at the first angular position, the second angular position, and between the first angular position and the second angular position. Some example methods may further comprise installing the support structure, such as at a fixed location or on a movable object. It will be appreciated that although the example method described in the context of a solar panel mount comprising torsion springs, similar methods may be used in connection with other embodiments described herein, such as embodiments including counterweights and/or linear extension springs.

It is within the scope of the disclosure to use any feature disclosed herein in connection with seasonal tilting and/or daily rotation, regardless of the context in which such feature is initially described.

In some example embodiments, the angle change for the seasons and/or the angle change to track the sun over the course of a day may be done manually. Or, a small motor (e.g., a small DC torque motor) could be installed to move the unit through the year or day or whenever desired. With a motor, a locking mechanism may be used so the system couldn't rotate on its own and to maintain integrity during wind conditions. See, for example, gearbox/torque motor 1003 shown in FIG. 14, which may be arranged to pivot array 1012 East to West about daily pivot axis 1007 over the course of a day to maintain array 1012 substantially facing the Sun.

Some example embodiments according to at least some aspects of the present disclosure may include any combination of the various spring, counterweight, and lock features described herein. For example, an example embodiment may include opposed torsion springs as described in connection with FIGS. 2-5 in combination with a counterweight assembly as described in connection with FIGS. 6-8. For ease of manufacture and distribution, some such embodiments may include common torsion springs for a plurality of latitudes and counterweight mass(es) selected for a particular latitude. More generally, it is within the scope of the present disclosure to utilize any one or more features of any one or more example embodiments described herein in connection with any other one or more features of any other one or more example embodiments described herein. Accordingly, any combination of any of the features or embodiments described herein is within the scope of the disclosure.

It is within the scope of the disclosure to utilize the various features of example embodiments described herein in connection with solar panels comprising photovoltaic panels and/or other solar collectors, and, as used herein, "solar panel" includes any such device. For example, the principals described herein and some example embodiments according to at least some aspects of the present disclosure may be utilized to provide seasonal tilting and/or daily rotation of solar water heating panels. One of skill in the art will recognize that some design changes may be necessary for photovoltaic arrays and/or arrays of other types of solar collectors. For example, heavier panels may require stronger supporting structures, bearings, etc., as well as springs with higher spring constants, larger counterweights, etc. Such design choices are within the scope of this disclosure.

Following from the above description and invention summaries, it should be apparent to those of ordinary skill in the art that, while the methods and apparatuses herein described constitute example embodiments according to the present disclosure, it is to be understood that the scope of the disclosure contained herein is not limited to the above precise embodiments and that changes may be made without departing from the scope of the disclosure. Likewise, it is to be understood that it is not necessary to meet any or all of the identified advantages or objects disclosed herein in order to fall within the scope of the disclosure, since inherent and/or unforeseen advantages may exist even though they may not have been explicitly discussed herein. Further, it is to be understood that any example description and/or annotations included in the drawings as well as any example calculations included herein are merely for purposes of explanation of example embodiments and are not to be considered as limiting to the scope of the disclosure.

What is claimed is:

1. A device for mounting for a solar array, the device comprising:
    a solar panel carrier configured to receive a solar array attached thereto to form a panel assembly;
    a pivot configured to pivotably secure the solar panel carrier with respect to a support structure so that the solar panel carrier is tiltable about a pivot axis between a first angular position, a second angular position, and a nominal angular position between the first angular position and the second angular position; and
    a restoring moment element operatively connected to the solar panel carrier and configured to exert a restoring moment on the solar panel carrier opposite in direction and approximately equal in magnitude to a gravitational moment of the panel assembly when the solar panel carrier is at the first angular position, the second angular position, and between the first angular position and the second angular position;
    wherein, when the solar panel carrier is at a nominal angular position between the first angular position and the second angular position, a center of gravity of the panel assembly is above and substantially vertically aligned with the pivot axis.

2. The device of claim 1,
    wherein the restoring moment comprises a first restoring moment in a first direction when the solar panel carrier is between the nominal angular position and the first angular position; and
    wherein the restoring moment comprises a second restoring moment in a second direction opposite the first direction when the solar panel carrier is between the nominal angular position and the second angular position.

3. The device of claim 2,
    wherein, when the solar panel carrier is at the nominal angular position, the first restoring moment is approximately zero and the second restoring moment is approximately zero;
    wherein, when the solar panel carrier is between the nominal angular position and the first angular position, the first restoring moment is greater than zero and the second restoring moment is approximately zero; and
    wherein when the solar panel carrier is between the nominal angular position and the second angular position, the first restoring moment is approximately zero and the second restoring moment is greater than zero.

4. The device of claim 2, wherein the restoring moment element comprises a first torsion spring arranged to exert the first restoring moment.

5. The device of claim 4, wherein the restoring moment element comprises a second torsion spring arranged to exert the second restoring moment.

6. The device of claim 5,
    wherein each of the first torsion spring and the second torsion spring comprises a respective helical torsion spring disposed around the pivot axis;
    wherein the first torsion spring is disposed about the pivot so that a first leg of the first torsion spring is arranged to act on the support structure and a second leg of the first torsion spring is arranged to act on the solar panel carrier; and
    wherein the second torsion spring is disposed about the pivot so that a first leg of the second torsion spring is arranged to act on the support structure and a second leg of the second torsion spring is arranged to act on the solar panel carrier.

7. The device of claim 6,
    wherein the first leg of the first torsion spring is arranged to act on the support structure at a first point;
    wherein the second leg of the first torsion spring is arranged to act on the solar panel carrier at a second point;
    wherein the first leg of the second torsion spring is arranged to act on the support structure at a third point; and
    wherein the second leg of the second torsion spring is arranged to act on the solar panel carrier at a fourth point.

8. The device of claim 6,
    wherein, when the solar panel carrier is between the nominal angular position and the first angular position, the first torsion spring exerts the first restoring moment between the support structure and the solar panel carrier about the pivot axis;
    wherein, when the solar panel carrier is between the nominal angular position and the first angular position, the second torsion spring is disengaged from at least one of the support structure and the panel carrier;
    wherein, when the solar panel carrier is between the nominal angular position and the second angular position, the second torsion spring exerts the second restoring moment between the support structure and the solar panel carrier about the pivot axis; and
    wherein, when the solar panel carrier is between the nominal angular position and the second angular position, the first torsion spring is disengaged from at least one of the support structure and the panel carrier.

9. The device of claim 2, wherein the restoring moment element comprises a counterweight assembly coupled for rotation with the solar panel carrier about the pivot axis.

10. The device of claim 9, wherein, when the solar panel carrier is at the nominal angular position, a center of gravity of the counterweight assembly is below and substantially vertically aligned with the pivot axis.

11. The device of claim 9, wherein the counterweight assembly comprises an arm coupled to the solar panel carrier and a counterweight disposed on the arm radially distant from the pivot axis.

12. The device of claim 9, wherein the restoring moment element comprises a combined counterweight and lock assembly configured to selectively secure the solar panel assembly at at least one of the first angular position and the second angular position, the combined counterweight and lock assembly comprising the counterweight assembly.

13. The device of claim 9,
wherein the restoring moment element comprises a first torsion spring and a second torsion spring;
wherein, when the solar panel carrier is between the nominal angular position and the first angular position, the counterweight assembly and the first torsion spring together exert the first restoring moment; and
wherein, when the solar panel carrier is between the nominal angular position and the second angular position, the counterweight assembly and the second torsion spring together exert the second restoring moment.

14. The device of claim 2, wherein the restoring moment element comprises a first linear extension spring arranged to exert the first restoring moment.

15. The device of claim 14,
wherein the restoring moment element comprises a first linear extension spring assembly comprising
an arm extending from and coupled for rotation with the solar panel carrier, a first coupler rotatably and slidably disposed on the arm,
a first anchor disposed at a first fixed position with respect to the support structure, and
the first linear extension spring; and
wherein the first linear extension spring extends between the first anchor and the first coupler.

16. The device of claim 15, wherein the first coupler comprises a slot rotatably and slidably disposed on a traveler disposed on the arm.

17. The device of claim 15,
wherein the restoring moment element comprises a second linear extension spring assembly arranged to exert the second restoring moment, the second linear extension spring assembly comprising
a second coupler rotatably and slidably disposed on the arm,
a second anchor disposed at a second fixed position with respect to the support structure, and
a second linear extension spring,
wherein the second linear extension spring extends between the second anchor and the second coupler.

18. The device of claim 2, wherein, when the solar panel carrier is at the first angular position, the second angular position, and between the first angular position and the second angular position, an external moment required to tilt the panel assembly about the pivot axis is about equal to that which is required to overcome friction in the pivot.

19. The device of claim 1, wherein the pivot axis comprises one of a seasonal pivot axis and a daily pivot axis.

20. The device of claim 1, wherein, in the first angular position and the second angular position, at least a portion of the solar array is vertically directly above the pivot axis.

21. The device of claim 1, wherein, in a direction perpendicular to the pivot axis and parallel to a solar collection face of the solar array, the pivot axis is located between opposite distant-most edges of the solar array.

22. The device of claim 1, wherein, in the first angular position, the second angular position, and the nominal angular position, a solar collection face of the solar array is oriented to collect solar energy from solar rays striking the solar collection face.

23. The device of claim 1, wherein, when the solar panel carrier is at the nominal angular position, the center of gravity of the panel assembly is above and vertically aligned with the pivot axis.

24. A solar panel installation, comprising:
the support structure;
the device of claim 1 mounted to the support structure; and
the solar array secured to the solar panel carrier;
wherein the solar array comprises at least one solar panel.

25. The solar panel installation of claim 24, wherein the support structure is one of disposed at a fixed location and disposed on a movable object.

26. A method of installing a solar array, the method comprising:
disposing a pivot of a solar panel mount on a support structure, the pivot pivotably securing a solar panel carrier to the support structure so that the solar panel carrier is tiltable about a pivot axis between a first angular position and a second angular position; and
wherein, when a solar array is disposed on the solar panel carrier, the solar array and the panel carrier form a panel assembly;
wherein, when the solar panel carrier is at a nominal angular position between the first angular position and the second angular position, a center of gravity of the panel assembly is above and substantially vertically aligned with the pivot axis;
wherein the solar panel mount comprises a restoring moment element operatively connected to the solar panel carrier and configured to exert a restoring moment on the solar panel carrier opposite in direction and approximately equal in magnitude to a gravitational moment of the panel assembly when the solar panel carrier is at the first angular position, the second angular position, and between the first angular position and the second angular position.

27. The method of claim 26, further comprising disposing the solar array on the solar panel carrier, the solar array comprising at least one solar panel.

28. The method of claim 27,
further comprising installing the support structure;
wherein installing the support structure comprises one of installing the support structure at a fixed location and installing the support structure on a movable object.

* * * * *